US012555432B2

(12) United States Patent
Abe et al.

(10) Patent No.: US 12,555,432 B2
(45) Date of Patent: Feb. 17, 2026

(54) COIN HOPPER, ROTATING BODY OF COIN HOPPER, AND COIN PROCESSING DEVICE

(71) Applicant: ASAHI SEIKO CO., LTD., Tokyo (JP)

(72) Inventors: Hiroshi Abe, Saitama (JP); Kazuya Tanaka, Saitama (JP)

(73) Assignee: ASAHI SEIKO CO., LTD., Tokyo (JP)

( * ) Notice: Subject to any disclaimer, the term of this patent is extended or adjusted under 35 U.S.C. 154(b) by 777 days.

(21) Appl. No.: 17/911,166

(22) PCT Filed: Sep. 13, 2021

(86) PCT No.: PCT/JP2021/033458
§ 371 (c)(1),
(2) Date: Sep. 13, 2022

(87) PCT Pub. No.: WO2022/059631
PCT Pub. Date: Mar. 24, 2022

(65) Prior Publication Data

US 2023/0141040 A1 May 11, 2023

(30) Foreign Application Priority Data

Sep. 15, 2020 (JP) ................................ 2020-154356
Aug. 20, 2021 (JP) ................................ 2021-134543

(51) Int. Cl.
*G07D 9/00* (2006.01)
*G07D 3/12* (2006.01)
*G07D 13/00* (2006.01)

(52) U.S. Cl.
CPC ............ *G07D 9/008* (2013.01); *G07D 3/128* (2013.01)

(58) Field of Classification Search
CPC .. G07D 1/00; G07D 1/02; G07D 1/04; G07D 1/06; G07D 1/08; G07D 3/00; G07D 3/02;

(Continued)

(56) References Cited

U.S. PATENT DOCUMENTS

2005/0233684 A1* 10/2005 Abe ...................... G07D 9/008 453/49
2008/0299886 A1 12/2008 Enomoto (Continued)

FOREIGN PATENT DOCUMENTS

DE 3602291 A1 7/1987
GB 2185341 A 7/1987

(Continued)

OTHER PUBLICATIONS

International Search Report (PCT/ISA/210) dated Oct. 12, 2021, issued by the International Searching Authority in counterpart International Application No. PCT/JP2021/033458.

(Continued)

*Primary Examiner* — Jeffrey A Shapiro
(74) *Attorney, Agent, or Firm* — Sughrue Mion, PLLC

(57) ABSTRACT

A coin hopper includes a container, a base, a rotating body having separation holes for holding the coin and being disposed so as to face the base, and a control pin that is disposed in a conveyance path for the coin held by the rotating body, that comes into contact with the coin being conveyed, and that changes a moving direction of the coin. The rotating body includes a first resin rotating body, a metal rotating body, and a second resin rotating body. The metal rotating body is sandwiched between the first resin rotating body and the second resin rotating body. The first resin rotating body, the metal rotating body, and the second resin rotating body are fixed to one another.

18 Claims, 15 Drawing Sheets

(58) Field of Classification Search
CPC .. G07D 3/04; G07D 3/06; G07D 3/08; G07D 3/10; G07D 3/12; G07D 3/121; G07D 3/123; G07D 3/125; G07D 3/126; G07D 3/128; G07D 3/14; G07D 3/16; G07D 9/008; G07D 9/00; G07D 9/04; G07D 9/06; G07D 9/065; G07D 13/00; G07D 2201/00
USPC ........... 453/6, 10, 12, 13, 33, 34, 35, 49, 57
See application file for complete search history.

(56) References Cited

U.S. PATENT DOCUMENTS

| | | | | |
|---|---|---|---|---|
| 2012/0156976 A1* | 6/2012 | Blake | G06Q 20/18 | 453/4 |
| 2012/0238196 A1* | 9/2012 | Umeda | G07D 3/128 | 453/3 |
| 2015/0213665 A1* | 7/2015 | Umeda | G07D 3/128 | 453/57 |
| 2019/0337676 A1* | 11/2019 | Hosokawa | B65D 25/28 | |

FOREIGN PATENT DOCUMENTS

| | | | |
|---|---|---|---|
| GB | 2 378 800 | A | 2/2003 |
| JP | 2-38657 | U | 3/1990 |
| JP | 6-187533 | A | 7/1994 |
| JP | 10-240993 | A | 9/1998 |
| JP | 2001-236545 | A | 8/2001 |
| JP | 2003-20127 | A | 1/2003 |
| JP | 2008-204156 | A | 9/2008 |
| JP | 2009-70008 | A | 4/2009 |
| JP | 2017-151818 | A | 8/2017 |

OTHER PUBLICATIONS

Written Opinion (PCT/ISA/237) dated Oct. 12, 2021, issued by the International Searching Authority in counterpart International Application No. PCT/JP2021/033458.

European Extended Search Report issued Oct. 8, 2024 by the European Patent Office for EP Patent Application No. 21869318.2.

* cited by examiner

COIN HOPPER, ROTATING BODY OF COIN HOPPER, AND COIN PROCESSING DEVICE

CROSS-REFERENCE TO RELATED APPLICATIONS

This application is a National Phase Entry of PCT International Application No. PCT/JP2021/033458 filed on Sep. 13, 2021, which claims priority to Japanese Patent Application No. 2020-154356 filed on Sep. 15, 2020, and Japanese Patent Application No. 2021-134543 filed on Aug. 20, 2021, the contents of all of which are incorporated herein by reference in their entirety.

TECHNICAL FIELD

The present invention relates to a coin hopper that feeds coins one by one, a rotating body used for the coin hopper, and a coin processing device equipped with the coin hopper.

BACKGROUND ART

There is known a coin hopper that includes a container for storing a plurality of coins and that discharges the coins stored in the container one by one.

For example, a coin hopper disclosed in JP-A-2008-204156 includes a storing bowl for storing a large number of coins and a payout unit for discharging coins in the storing bowl one by one. An opening is provided in a bottom portion of the storing bowl. A rotating body is disposed on an upper surface of the payout unit so as to face the opening. The rotating body has a plurality of through holes through which coins enter. Coins entered the through holes of the rotating body are held on a flat base disposed at a back surface side of the rotating body. A pushing protrusion for pushing the coin is provided on a side surface of the through hole. Accompanying with the rotation of the rotating body, the coin is pushed by the pushing protrusion and moves on the base. A moving direction of the coin moved to a predetermined position on the base is changed by a pin of the payout unit, and the coin is discharged to an outlet passage. The coins in the storing bowl are stirred by the rotation of the rotating body.

The pushing protrusion comes into contact with the coin entered into the through hole, and pushes the coin in the moving direction in accordance with the rotation of the rotating body. The pushing protrusion is worn or damaged by being brought into contact with the coin. Therefore, it is considered to use a rotating body reinforced by a reinforcing material. In the rotating body, a metal plate is inserted into a resin by integral molding. Since the rotating body is reinforced by the metal plate, durability is improved. A coin hopper in consideration of such durability has been considered.

Further, currency in circulation issued by a nation includes coins of a plurality of denominations. Since a coin has a different diameter, thickness, material, and design for each denomination, anyone can easily identify a denomination. A coin processing device detects a characteristic of a coin and identifies a denomination of the coin. In addition, the coin processing device can store an identified coin in a container for each denomination. The coin processing device identifies a denomination of a coin, stores coins for each denomination, and pays out a stored coin as needed. The coin processing device can pay out coins of a desired amount by storing coins in a coin hopper for each denomination and controlling the coin hopper.

For example, a coin depositing and dispensing machine disclosed in JP-A-2017-151818 is known as an example of a coin processing device. In addition, an automatic change machine is known as an example of a coin processing device. The automatic change machine stores inserted coins for each denomination. The automatic change machine calculates a denomination and the number of coins to be discharged based on an amount of change. The automatic change machine controls a coin hopper corresponding to each denomination to discharge a coin based on the calculated denomination and the calculated number of coins.

A rotating body made of resin can be reduced in weight, but is inferior in durability to a rotating body made of metal. Therefore, it is considered to form a part of a rotating body with metal. One method is to use the above-described rotating body in which a metal plate is inserted into resin by integral molding. Another method is to use a rotating disk disclosed in JP-A-2003-20127. In the rotating disk, an extrusion disk having a metal pushing protrusion is fixed to a resin disk by a screw.

CITATION LIST

Patent Literature

Patent Literature 1: JP-A-2008-204156
Patent Literature 2: JP-A-2017-151818
Patent Literature 3: JP-A-2003-20127

SUMMARY OF INVENTION

Technical Problem

A rotating body in which a metal plate and resin are integrally molded is considered in the related art. In the related rotating body, a periphery of the metal plate is covered with resin, and strength of a resin layer is improved by the metal plate. A pushing protrusion for pushing a coin is reinforced by the metal plate in the resin layer. Even when the metal plate is inserted into the rotating body, an exposed portion of the resin may be damaged by being brought into contact with a coin. Depending on a damaged position of the rotating body, the rotating body may not function normally. In addition, when a foreign object other than a coin enters a container, the rotating body may come into contact with the foreign object, and may be worn or damaged. In a worst case, the rotating body cannot be used and needs to be replaced. Even when there is a problem only in a part of the integrally molded rotating body, it is necessary to replace the entire rotating body. Such a rotating body needs to be replaced even when there is a usable portion, and there is a problem that the usable portion is wasted.

A rotating body integrally formed of resin and metal has a problem in that the rotating body is peeled off by repeatedly applying an impact to a connection portion between the metal and the resin. Strength of the connection portion is improved by a surface treatment of a metal component or an additional processing such as complication of a shape. On the other hand, the rotating body in which the strength of the connection portion between the metal and the resin is improved has a problem in that a manufacturing process is increased, components are complicated, and time required for manufacturing the components are increased, and the like.

In a rotating disk in which an extrusion disk provided with a metal pushing protrusion for pushing a coin is screwed and fixed to the resin disk, the pushing protrusion is formed by bending a metal plate twice. A tip end of the pushing protrusion comes into contact with a coin and pushes the coin. Since the extrusion disk is screwed to the resin disk, a force is applied to a bent portion of the pushing protrusion when the pushing protrusion pushes a coin. Therefore, the bent portion of the pushing protrusion may be deflected and deformed. In order to sufficiently increase strength, it is necessary to use a thick metal plate, and there is a problem that the rotating disk becomes heavy. Since the pushing protrusion is formed by bending the metal plate and a tip end of the metal plate comes into contact with a coin, the coin may be damaged by an edge of the metal plate.

Since the extrusion disk is fixed to the resin disk by a screw, manufacturing processes and quality control such as screw tightening work and a torque control are complicated. When the screw is loosened, the extrusion disk moves relative to the resin disk, a coin may enter under the extrusion disk, and a jam may occur.

A coin processing device using the related coin hopper has a problem in that a coin payout malfunction occurs when a malfunction occurs in a rotating body. Therefore, it is desired to use a coin hopper having high durability. It is desired to use a coin hopper that can be easily maintained in case of a malfunction occurs.

Solution to Problem

A coin hopper according to the present invention includes a container that stores a coin, a base that supports the coin, a rotating body that is provided with a plurality of separation holes each of which is configured to hold the coin one by one, that is fixed to a rotation shaft, and that is disposed so as to face the base, and a control pin that is disposed in a conveyance path for the coin held by the rotating body, that comes into contact with the coin being conveyed, and that changes a moving direction of the coin. The coin stored in the container is conveyed to the base in a state that the coin is held in the separation holes, the coin is brought into contact with the control pin, and the coin is moved in a discharge direction. The rotating body includes a first resin rotating body made of resin, a metal rotating body in which a metal pushing piece for pushing the coin is provided for each of the separation holes, and a second resin rotating body made of resin. The metal rotating body has a first through hole. The first resin rotating body or the second resin rotating body has a positioning protrusion at a position corresponding to the first through hole. The first resin rotating body has a first contact portion, and the second resin rotating body has a second contact portion. The metal rotating body is sandwiched between the first resin rotating body and the second resin rotating body in a state that the pushing piece is exposed from the first resin rotating body. The positioning protrusion is fitted into the first through hole and restricts movement relative to the metal rotating body in a rotation direction. The first resin rotating body, the metal rotating body, and the second resin rotating body are fixed to one another by engaging the first contact portion and the second contact portion.

A coin processing device according to the present invention includes the coin hopper described above, and a coin receiving portion that receives and collects the coin discharged from the coin hopper. A plurality of the coin hoppers are provided, and the coin receiving portion receives the coin discharged from each of the coin hoppers.

A rotating body of a coin hopper according to the present invention, the coin hopper includes a container that stores a coin; a base that supports the coin; the rotating body that is provided with a plurality of separation holes each of which is configured to hold the coin one by one, that is fixed to a rotation shaft, and that is disposed so as to face the base; and a control pin that is disposed in a conveyance path for the coin held by the rotating body, that comes into contact with the coin being conveyed, and that changes a moving direction of the coin. The coin stored in the container is conveyed to the base in a state that the coin is held in the separation holes, the coin is brought into contact with the control pin, and the coin is moved in a discharge direction. The rotating body includes a first resin rotating body made of resin, a metal rotating body in which a metal pushing piece for pushing the coin is provided for each of the separation holes, and a second resin rotating body made of resin. The metal rotating body has a first through hole. The first resin rotating body or the second resin rotating body has a positioning protrusion at a position corresponding to the first through hole. The first resin rotating body has a first contact portion, and the second resin rotating body has a second contact portion. The metal rotating body is sandwiched between the first resin rotating body and the second resin rotating body in a state that the pushing piece is exposed from the first resin rotating body. The positioning protrusion is fitted into the first through hole and restricts movement relative to the metal rotating body in a rotation direction. The first resin rotating body, the metal rotating body, and the second resin rotating body are fixed to one another by engaging the first contact portion and the second contact portion.

Advantageous Effects of Invention

According to the present invention, durability of a rotating body and a coin hopper can be improved. According to the coin hopper with improved durability, it is possible to reduce or prevent a coin payout failure of a coin processing device. In addition, it is possible to provide a rotating body, a coin hopper, and a coin processing device having excellent maintainability.

BRIEF DESCRIPTION OF DRAWINGS

FIG. 8A is a view showing a first state of the operation of the coin hopper. FIG. 8B is a view showing a second state of the operation of the coin hopper. FIG. 8C is a view showing a third state of the operation of the coin hopper. FIG. 8D is a view showing a fourth state of the operation of the coin hopper. FIG. 8E is a view showing a fifth state of the operation of the coin hopper.

FIG. 8F is a view showing a sixth state of the operation of the coin hopper.

DESCRIPTION OF EMBODIMENTS

Figure 1:
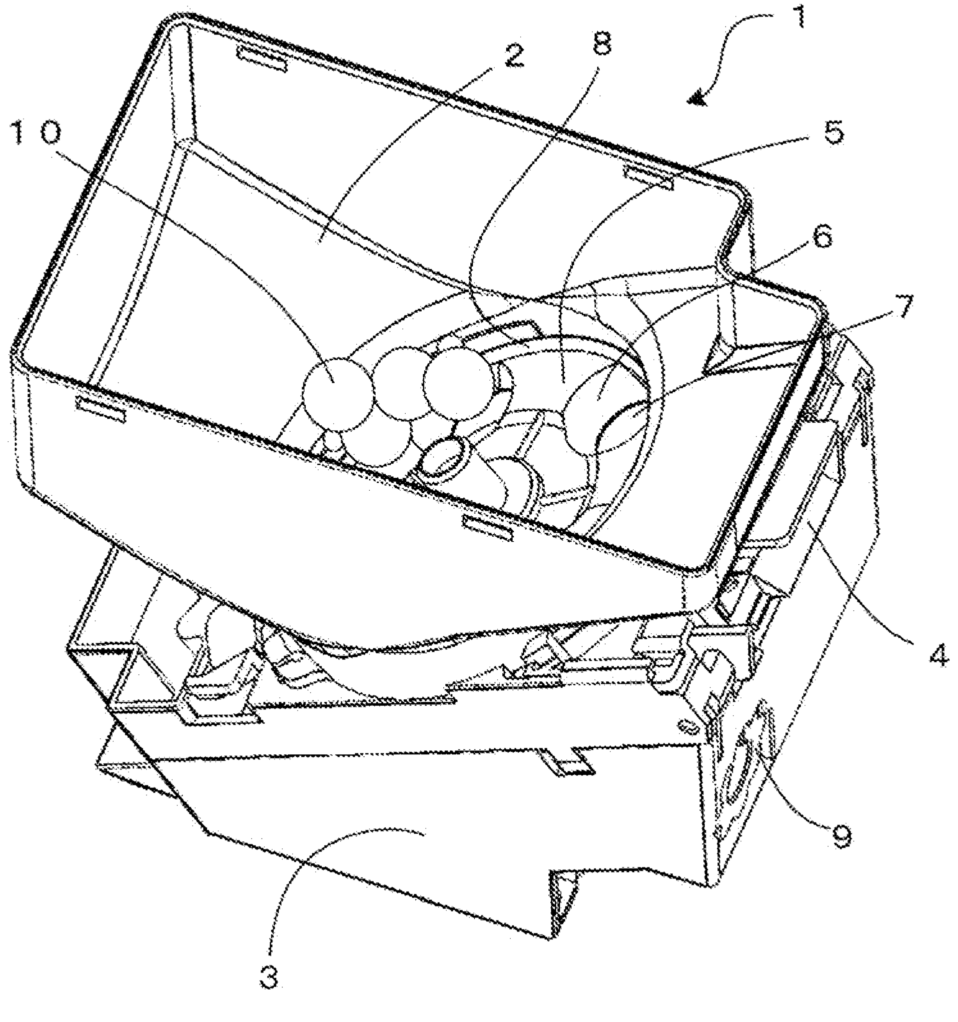
FIG. 1 is a perspective view showing a coin hopper.

Hereinafter, embodiments of the present invention will be described in detail with reference to the drawings. The drawings schematically show the present invention to an extent that the present invention can be sufficiently understood. Therefore, the present invention is not limited to the illustrated examples. In the drawings, common components and similar components are denoted by the same reference numerals, and redundant description thereof will be omitted.

First, a coin hopper will be described with reference to FIG. 1. FIG. 1 is a perspective view showing a coin hopper.

The coin hopper 1 includes a container 2 that stores coins 10 and a main body 3 that separates and pays out the coins 10 one by one. The container 2 can be attached to and detached from the main body 3. A guide portion 8 that is a substantially circular opening portion is provided at a lower portion of the container 2. A rotating body 5 is provided at an upper portion of the main body 3. The guide portion 8 is disposed along an outer periphery of the rotating body 5, and guides the coins 10 to be stacked on the rotating body 5.

The rotating body 5 is provided with a plurality of separation holes 6. The separation holes 6 are through holes that pass through the front and back of the rotating body 5. The coin 10 enters the separation hole 6 and the rotating body 5 causes the coin 10 to slide on a base 7. A control pin is provided at a predetermined position of the base 7. A course of the coin 10 that comes into contact with the control pin is changed toward a payout opening 4, and the coin 10 is discharged from the payout opening 4.

The flat base 7 is provided at an upper portion of the main body 3, and the rotating body 5 rotates above the base 7. The guide portion 8 of the container 2 is disposed along the outer periphery of the rotating body 5. The rotating body 5 faces the opening of the guide portion 8. The base 7 is inclined such that one side of the base 7 where the payout opening 4 is disposed is higher in a vertical direction than an opposite side of the base 7. Since the base 7 is inclined, the coins 10 are likely to gather on a lower side of the container 2. When the rotating body 5 passes below the stacked coins 10, the coins 10 enters the separation holes 6. The coins 10 are conveyed to the payout opening 4 by the rotating body 5.

In this manner, the coin hopper 1 inserts the coins 10 stored in the container 2 into the separation holes 6 of the rotating body 5 one by one, carries the coins 10 to the payout opening 4, and discharges the coins 10.

The coins 10 have different elements such as size, material, and design for each denomination. A coin processing device is mounted with the coin hoppers 1 for each predetermined denomination at predetermined positions. For this purpose, the coin hopper 1 includes identification holes 9 corresponding to denominations respectively. In the coin processing device, protrusions corresponding to the identification holes 9 are provided at predetermined positions. Each of the coin hoppers 1 having the corresponding identification hole 9 is set at a predetermined position of the coin processing device.

Figure 2:
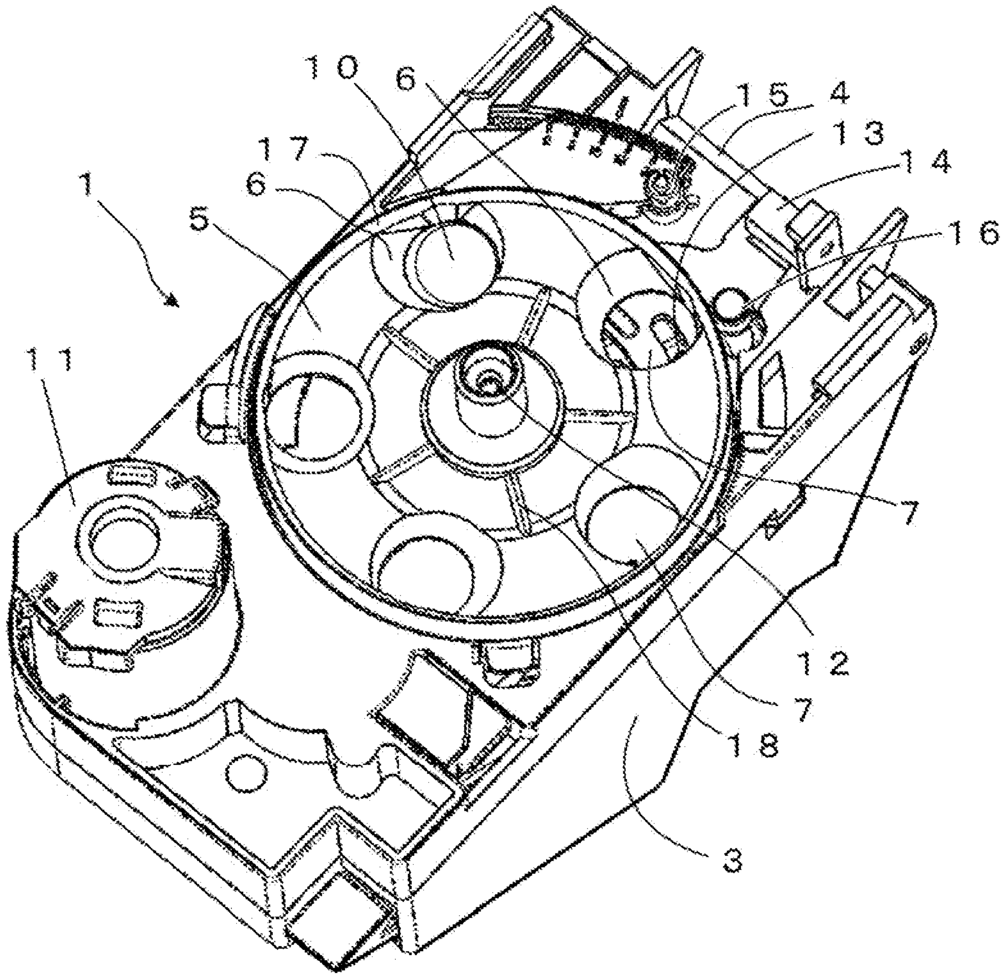
FIG. 2 is a perspective view showing a state that a coin container of the coin hopper is removed.

The coin hopper 1 will be described in more detail. FIG. 2 is a perspective view showing a state that the coin container of the coin hopper is removed.

A motor 11 that drives the rotating body 5 is disposed in the coin hopper 1. The rotation of the motor 11 is controlled by a control circuit (not shown). A gear (not shown) that connects the motor 11 and a rotation shaft (not shown) to which the rotating body 5 is fixed is disposed inside the main body 3. The rotation shaft passes through a through hole provided in the base 7. The rotating body 5 is fixed to the rotation shaft that protrudes from the base 7. A stirring portion 12 is a protrusion disposed at a rotation center of the rotating body 5, and stirs the coins 10 so that the coins 10 do not continue to stay at a deviated position. A mechanism for fixing the rotating body 5 to the rotation shaft is provided inside the stirring portion 12. Since a portion of the rotating body 5 fixed to the rotation shaft is made of metal, strength can be improved. For example, the stirring portion 12 may be made of metal. The rotating body 5 is provided with stirring blades 18. The stirring blade 18 is a protrusion provided on a front surface of the rotating body 5. The stacked coins 10 are stirred by the stirring blades 18. The stirring blades 18 are arranged radially from the center of the rotating body 5. In order to enhance stirring performance, concave portions are provided between adjacent stirring blades 18, and the front surface of the rotating body 5 is complicated.

Unevenness of the front surface of the rotating body 5 enables the rotating body 5 to effectively stir the stacked coins 10, and it is easy to cause the coins 10 to enter the separation hole 6. Therefore, the rotating body 5 is thick. In order to reduce a weight of the rotating body 5, a part of the rotating body 5 is formed by plastic and a part of the rotating body 5 is formed by metal. The rotating body 5 can be reduced in weight while maintaining strength. Since a portion of the rotating body 5 that comes into contact with the coins 10 is made of metal, the rotating body 5 can be prevented from being worn or damaged due to the contact with the coins 10.

The rotating body 5 rotates counterclockwise. A groove that avoids a control pin 13 is provided on a back surface side of the rotating body 5. Pushing pieces for pushing the coins 10 are disposed on the back surface side of the rotating body 5. In addition, a groove is provided between an outer peripheral portion of the rotating body 5 and each of the separation holes 6, and enables the coin 10 to pass through the groove. The coin 10 that entered the separation hole 6 comes into contact with the control pin 13 and is guided toward the payout opening 4. The coin 10 enters between a fixed roller 15 and a moving roller 16 while being pressed. The moving roller 16 is biased in a direction toward the fixed roller 15. When more than half of the coin 10 enters between the fixed roller 15 and the moving roller 16, the coin 10 passes through a space between the fixed roller 15 and the moving roller 16. At this time, the coin 10 is vigorously moved to the payout opening 4 by the biasing force of the moving roller 16. A discharge sensor 14 detects the discharged coin 10. A detection result is output to a control circuit (not shown). The control circuit can count the discharged coin 10. A plurality of the control pin 13 are disposed in a conveyance path through which the coins 10 are conveyed by the rotating body 5.

An outer wall 17 for restricting a movement of the coins 10 is provided at an outer side of the outer periphery of the rotating body 5. The outer wall 17 is not provided at least a space between the fixed roller 15 and the moving roller 16 in order to guide the coin 10 to the payout opening 4. The coins 10 can move toward the payout opening 4 from the portion where the outer wall 17 is not provided.

Figure 3:
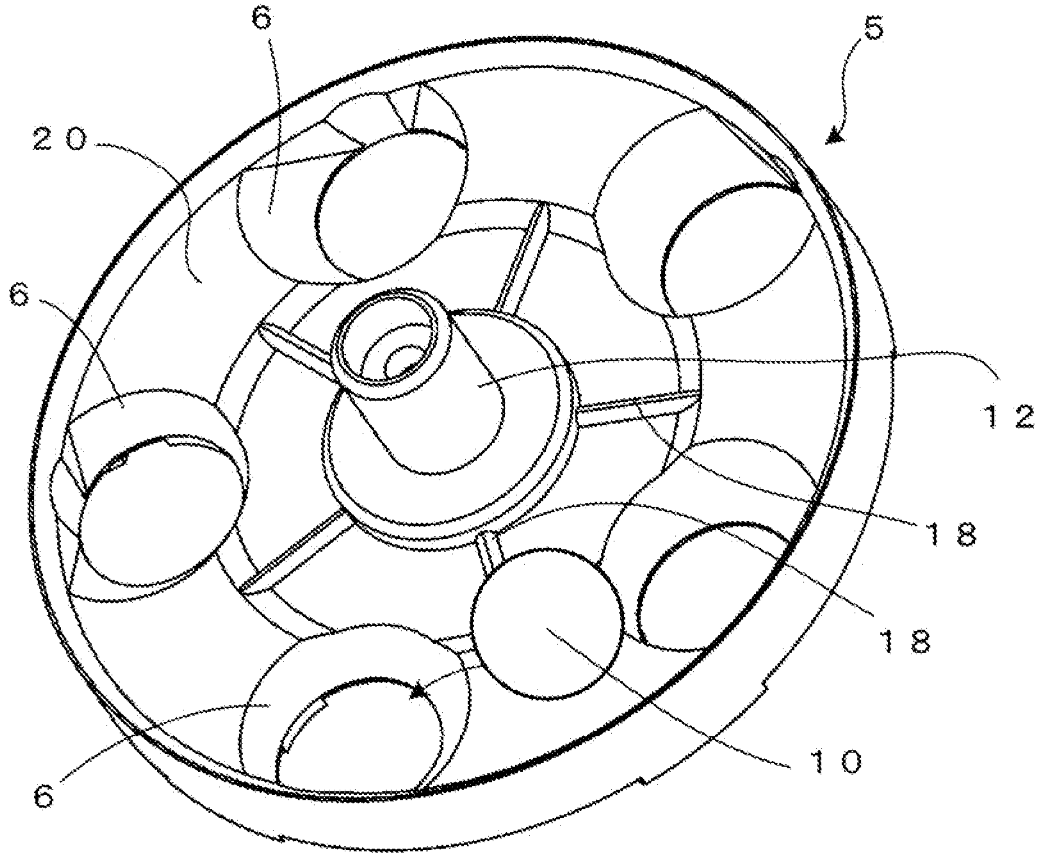
FIG. 3 is a perspective view showing a rotating body.

Next, the rotating body 5 will be described. FIG. 3 is a perspective view showing the rotating body. The coins 10 that are generally used are made of metal. An upper surface side member of the rotating body 5 is a first resin portion 20 made of resin such as plastic. A material of the first resin portion 20 is preferably engineering plastic in view from the perspective view of strength, durability, workability, and the like. The rotating body 5 is divided into three members which will be described later.

The rotating body 5 is worn by being brought into contact with the coins 10. In order to reduce or prevent wearing, the rotating body 5 includes a metal portion and a resin portion. The entire rotating body 5 may be made of metal. In order to reduce a weight of the rotating body 5, it is preferable that a part of the rotating body 5 is made of resin such as plastic. In addition, durability of the rotating body 5 can be improved by using metal to form a portion of the rotating body 5 that is greatly worn. The portion of the rotating body 5 that is greatly worn is the pushing pieces that push the coins 10 entered the separation holes 6. The pushing piece pushes the coin 10 in a state that the coin 10 is brought into contact with the control pin 13 (FIG. 2), the fixed roller 15 (FIG. 2), and the moving roller 16 (FIG. 2). Therefore, a force corresponding to a pushing force is applied to the pushing piece as a reaction force. In particular, a force is applied to a tip end of the pushing piece. Therefore, durability is improved by making the pushing piece of metal. The pushing pieces are disposed on a back surface side of the rotating body 5.

The rotating body 5 is provided with five separation holes 6. Alternatively, the rotating body 5 is provided with at least one separation hole 6. A maximum number of the separation holes 6 is determined based on a size of the rotating body 5 and a size of the coin 10.

Figure 4:
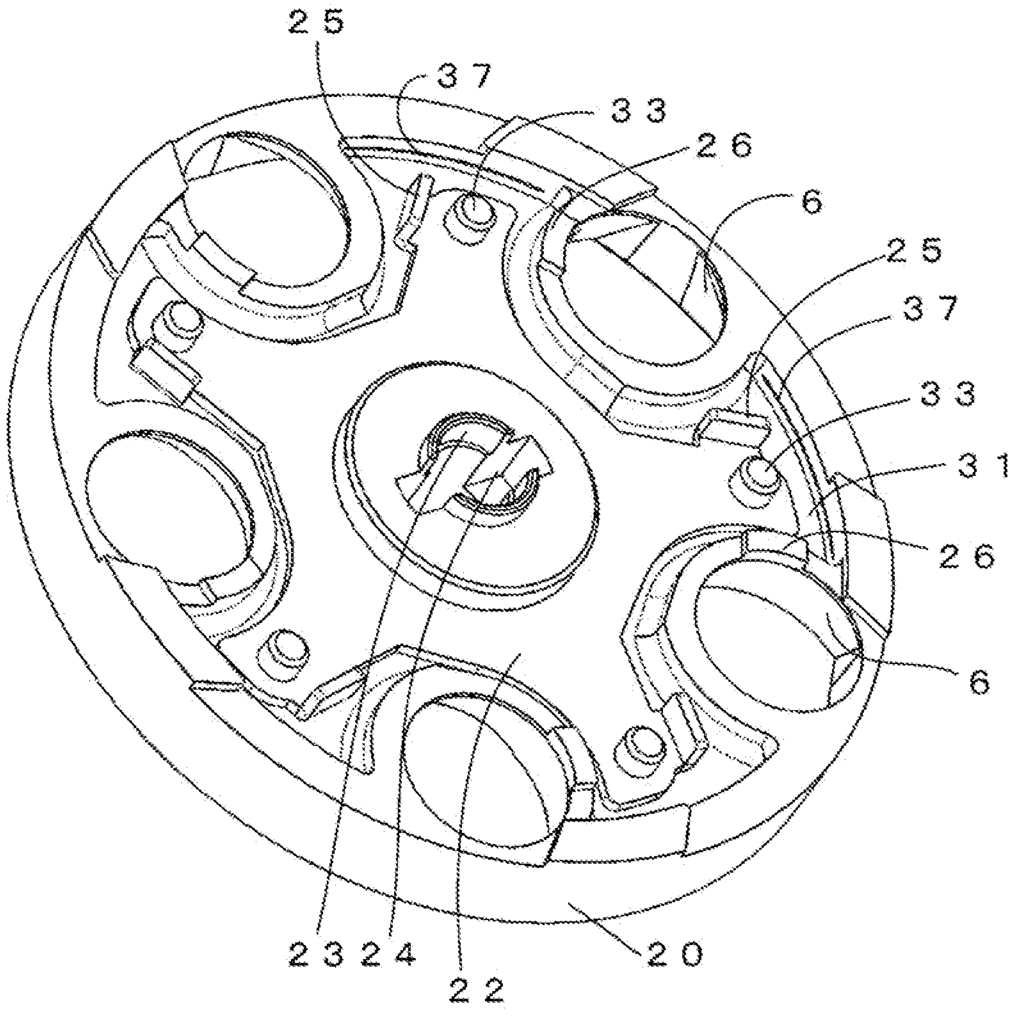
FIG. 4 is a view showing a back surface side of the rotating body.

Next, the back surface side of the rotating body 5 will be described. FIG. 4 is a view showing the back surface side of the rotating body.

A shaft hole 23 into which a rotation shaft for the rotating body 5 is inserted is provided in a central portion of the rotating body 5. The rotation shaft has a locking portion that passes through a center axis of the rotation shaft and is disposed perpendicular to an axial direction of the rotation shaft. A shaft locking groove 24 to be engaged with the locking portion is disposed in a central portion of the rotating body 5.

The first resin portion 20 is provided with five separation holes 6 at equal distances from the rotation center and at equal intervals. The separation hole 6 is a through hole that passes through the front and back of the first resin portion 20. A peripheral portion of the separation hole 6 is formed to be thick. A portion of a metal portion 22 other than a pushing piece 25 is made of a flat metal plate and is disposed in parallel to the base 7 (FIG. 2). The pushing piece 25 is formed by bending an edge of the flat plate substantially perpendicularly to a direction of the base 7 (FIG. 2). A surface of the pushing piece 25 that comes into contact with a coin is flat. For example, the metal portion 22 can be easily formed by cutting out an outer periphery of a flat plate by press processing and bending a portion serving as the pushing piece 25 by press processing. The metal portion 22 does not need to be subjected to a surface treatment for providing minute unevenness on a surface of the metal portion 22.

A central portion including a periphery of the shaft hole 23 and a periphery of the shaft locking groove 24, a peripheral portion of the first resin portion 20, and peripheral portions of the separation holes 6 protrude from a back surface side of the first resin portion 20 of the rotating body 5, and a concave portion 31 that is opened to the back surface side of the rotating body 5 is formed on the back surface side of the first resin portion 20 of the rotating body 5. Positioning protrusions 33 are provided in parts of the concave portion 31 between adjacent separation holes 6. The positioning protrusions 33 are protruding portions provided on the back surface side of the first resin portion 20. The metal portion 22 is accommodated in the concave portion 31. The metal portion 22 has through holes at portions corresponding to a protruding portion at the center of the first resin portion 20 and the positioning protrusions 33. The metal portion 22 is fitted to the protruding portion at the center of the first resin portion 20 and is fixed to the first resin portion 20. The metal portion 22 disposed in the concave portion 31 is fitted to the positioning protrusions 33 and is fixed to the first resin portion 20. The metal portion 22 is a metal plate made of an iron alloy such as stainless steel, an aluminum alloy, or the like. The metal portion 22 includes bent portions between the adjacent separation holes 6, and the bent portions function as the pushing pieces 25. The positioning protrusions 33 are disposed at an equal distance from the rotation center of the rotating body 5. The pushing pieces 25 are disposed on a circumference having a radius equal to the distance from the rotation center to the positioning protrusion 33. Reverse rotation pieces 26 that come into contact with the coins when the rotating body 5 rotates in a reverse direction are also disposed on the circumference of the first resin portion 20 having a radius equal to the distance from the rotation center to the positioning protrusions 33. Since the pushing piece 25 is formed by bending a flat plate, a contact surface with a coin is a flat surface.

The reverse rotation pieces 26 are disposed at a forward rotation direction side of the corresponding separation holes 6 of the rotating body 5. The pushing pieces 25 are disposed at a reverse rotation direction side of the corresponding separation holes 6 of the rotating body 5. The pushing piece 25 pushes the coin 10 when the rotating body 5 rotates in the forward direction, and the reverse rotation piece 26 pushes the coin 10 when the rotating body 5 rotates in the reverse direction. That is, a coin entered the separation hole 6 is positioned between the pushing piece 25 and the reverse rotation piece 26 and is conveyed.

Linear locking and fitting grooves 37 are formed in a portion that is a peripheral portion of the first resin portion 20 and forms an inner wall of the concave portion 31. The locking and fitting grooves 37 are formed in an inner wall at an outer peripheral side of the concave portion 31. The locking and fitting groove 37 is a groove to be fitted to a locking and fitting protrusion provided in a second resin portion 21 which will be described later. The locking and fitting groove 37 is disposed along an outer periphery of the first resin portion 20, and has a narrow and long shape.

Figure 5:
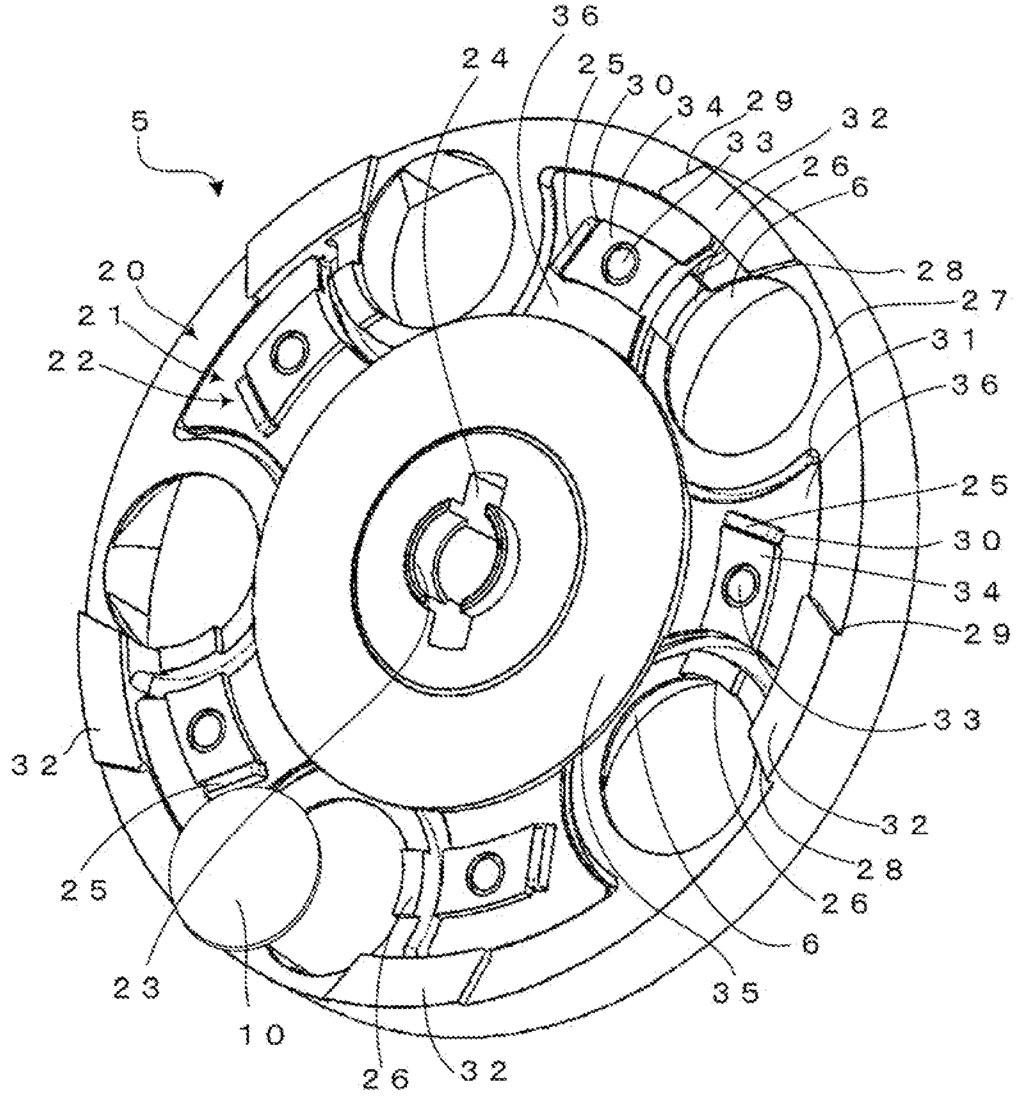
FIG. 5 is a perspective view showing the back surface side of the rotating body.

FIG. 5 is a perspective view showing a back surface side of the rotating body. FIG. 5 is a perspective view when the rotating body 5 is viewed from the back surface side. The rotating body 5 includes the metal portion 22, and resin portions of the first resin portion 20 and the second resin portion 21. The metal portion 22 is inserted into the concave portion 31 of the first resin portion 20. The second resin portion 21 is fixed to the first resin portion 20. The metal portion 22 is sandwiched and fixed between the first resin portion 20 and the second resin portion 21. The second resin portion 21 is provided with pushing piece holes 30 that are through holes at positions corresponding to the pushing pieces 25 of the metal portion 22. In addition, the second resin portion 21 is provided with through holes at portions corresponding to the positioning protrusions 33. The second resin portion 21 covers the metal portion 22 so that the metal portion 22 inserted into the concave portion 31 does not come off. The pushing pieces 25 pass through the pushing piece holes 30 respectively and are disposed in a manner of protruding from the resin portion. The metal portion 22 can be fixed to the second resin portion 21 by fitting the pushing piece 25 into the pushing piece hole 30. The first resin portion 20 or the second resin portion 21 may be referred to as a first resin rotating body that forms a resin portion of the rotating body 5, and the metal portion 22 may be referred to as a metal rotating body that forms a metal portion of the rotating body 5. The pushing piece 25 is disposed for each separation hole 6 provided in the rotating body 5. A central convex portion 34 is provided so as to correspond to each of the pushing pieces 25 and provided at a position adjacent to each of the pushing pieces 25. That is, the central convex portion 34 is provided for each pushing piece 25, and prevents the pushing piece 25 from being deformed in the rotation direction of the rotating body 5. A metal portion exposed from the second resin portion 21 toward the base 7 is the pushing piece 25 exposed from the pushing piece hole 30. A portion of a metal component that comes into contact with a coin is minimized. It can also be said that a portion of a resin component that receives a strong force from the coin 10 is replaced with a metal component.

First step portions 28 and second step portions 29 are disposed on an outer peripheral portion of the first resin portion 20 corresponding to the respective separation holes 6. Unevenness is formed on the outer peripheral portion of the first resin portion 20 by the first step portions 28 and the second step portions 29 which are provided so as to correspond to the separation holes 6. Five outer peripheral convex portions 32 are formed on the outer peripheral portion of the first resin portion 20. Concave portions are formed between the outer peripheral convex portions 32, and the coin 10 entered the separation hole 6 can pass through the concave portions. The coin 10 entered from the separation hole 6 can move through a passage wider than an opening of the separation hole 6 provided at the back surface side of the first resin portion 20 and the second resin portion 21. Since the passage is set to have a size that allows one coin 10 to enter, other coins 10 do not enter the passage from the separation hole 6 in a state that the coin 10 is present.

The second resin portion 21 is provided with base portions 36 extending radially, an inner peripheral convex portion 35, and the central convex portions 34. The inner peripheral convex portion 35 and the central convex portions 34 protrude from the base portions 36. Each of the central convex portions 34 has a through hole through which the positioning protrusion 33 passes. The second resin portion 21 is made of resin such as plastic. The second resin portion 21 is preferably made of engineering plastic. The second resin portion 21 is preferably made of the same material as the first resin portion 20. Since the second resin portion 21 does not come into contact with the coin 10, the second resin portion 21 can be made of resin having lower durability than the first resin portion 20 in regard of coming into contact with the coin 10.

The rotating body 5 is located above the base 7 (FIG. 2). In order to rotate the rotating body 5, a groove that avoids the control pin 13 (FIG. 2) is required. The pushing piece 25, the central convex portion 34, and the reverse rotation piece 26 are disposed between the inner peripheral convex portion 35 and the outer peripheral convex portion 32, and form concentric convex and concave portions. When the rotating body 5 rotates, the control pin 13 (FIG. 2) passes through concave portions formed concentrically. Surfaces of the pushing pieces 25, the central convex portions 34, the reverse rotation pieces 26, the inner peripheral convex portion 35, and the outer peripheral convex portions 32 are formed to be substantially flush with one another. The positioning protrusions 33 are provided in a manner of being flush with the central convex portions 34 or in a manner in which the positioning protrusions 33 do not protrude from the central convex portions 34.

The coin 10 entered the separation hole 6 is surrounded by the pushing piece 25, the reverse rotation piece 26, the central convex portion 34, and the outer peripheral convex portion 32, and is conveyed while being limited in a moving range. When the rotating body 5 rotates in a forward direction, the coin 10 is pushed by the pushing piece 25 and moves. When the rotating body 5 rotates in a reverse direction, the coin 10 is pushed by the reverse rotation piece 26 and moves. Although the reverse rotation piece 26 is made of resin, the reverse rotation piece 26 may be formed by bending the metal portion 22 in the same manner as the pushing piece 25. The rotating body 5 is less likely to be rotated in the reverse direction as compared with the forward direction. Therefore, the reverse rotation piece 26 is less likely to be worn or damaged by being brought into contact with the coin 10, as compared with the pushing piece 25. The reverse rotation piece 26 may be made of resin, and is more preferably made of metal. Similar to the pushing piece 25, the reverse rotation piece 26 can be formed by bending a part of the metal portion 22. The metal portion 22 is made of a material harder than the first resin portion 20 and the second resin portion 21. The durability of the rotating body 5 can be sufficiently improved by the metal portion 22. When the durability of the rotating body 5 is sufficiently high, a replacement frequency of the rotating body 5 is reduced. When the durability of the rotating body 5 is sufficient, the first resin portion 20 and the second resin portion 21 may be fixed by an adhesive. The first resin portion 20 and the second resin portion 21 may be fixed to each other by using a fitting mechanism and an adhesive in combination. In the case of fixing by an adhesive, a component can be replaced by peeling off an adhered portion. In addition, the resin portion can be replaced while leaving the metal portion 22.

The coin 10 is deposited on the first resin portion 20. Since the coin 10 may fall from above and hit the first resin portion 20, sufficient durability of the first resin portion 20 is required. When comparing a thickness of the first resin portion 20 and a thickness of the second resin portion 21 between the adjacent separation holes 6 in a rotation direction of the rotating body 5, the first resin portion 20 is thicker than the second resin portion 21. Preferably, the first resin portion 20 is thicker than a total thickness of the second resin portion 21 and the metal portion 22 at a predetermined location. The durability of the first resin portion 20 can be increased by increasing the thickness of the first resin portion 20. The durability of the rotating body 5 is improved by the metal portion 22 that pushes the coin 10 and the first resin portion 20. The rotating body 5 formed in this manner is less likely to be subjected to a fatal damage in which the rotating body 5 needs to be replaced.

Figure 6:
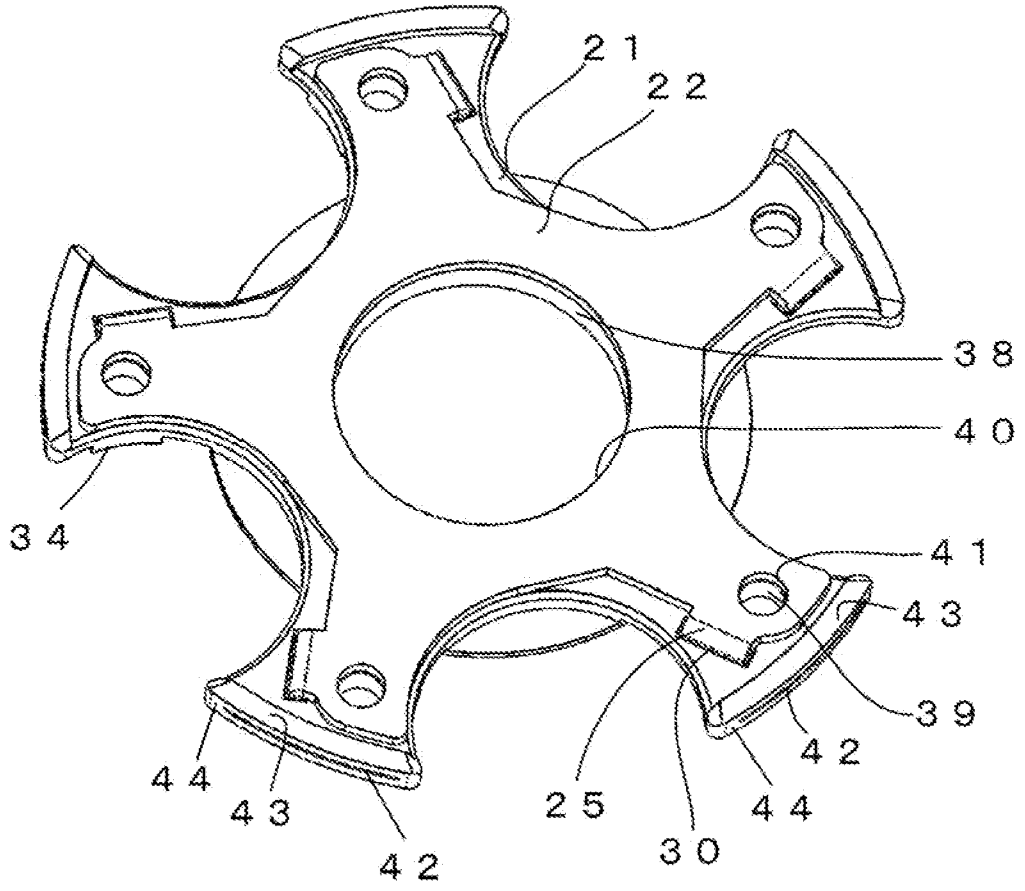
FIG. 6 is a first view showing a structure of the rotating body.
Figure 7:
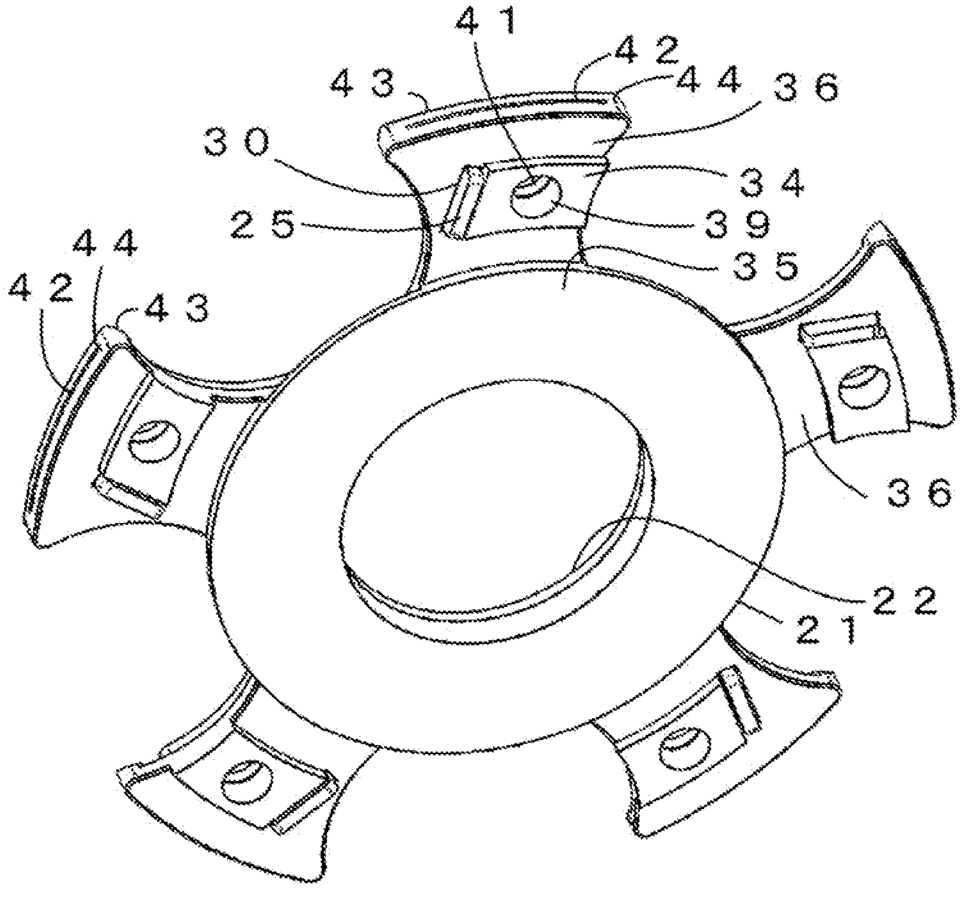
FIG. 7 is a second view showing the structure of the rotating body.

Next, the second resin portion 21 and the metal portion 22 will be described with reference to FIGS. 6 and 7. FIG. 6 is a first view showing a structure of the rotating body. FIG. 7 is a second view showing a structure of the rotating body. FIG. 6 is a view seen from the metal portion 22 side, and FIG. 7 is a view seen from the second resin portion 21 side.

The second resin portion 21 is provided with the pushing piece holes 30 corresponding to the pushing pieces 25 respectively. The pushing piece holes 30 are through holes that pass through the front and back of the second resin portion 21. The pushing pieces 25 are fitted into the pushing piece holes 30 respectively.

A first through hole 38 having a circular opening is provided in a central portion of the second resin portion 21. A third through hole 40 having a circular opening is provided in a central portion of the metal portion 22. The first through hole 38 and the third through hole 40 have the same opening diameter. A central protruding portion of the first resin portion 20 (FIG. 5) is fitted into the first through hole 38 and the third through hole 40. The metal portion 22 is provided with five arms on which the pushing pieces 25 are formed. Each of the five arms is provided with the pushing piece 25. The five pushing pieces 25 and the five arms are integrally formed. The metal portion 22 and the second resin portion 21 are easily attached and detached.

Each of five arms that radially extend from a central portion of the second resin portion 21 is provided with a second through hole 39 having a circular opening. Each of the five arms that radially extend from the center of the metal portion 22 is provided with a fourth through hole 41 having a circular opening. The second through hole 39 and the fourth through hole 41 have the same opening diameter. Each of the second through hole 39 and the fourth through hole 41 has an opening having a shape corresponding to the positioning protrusion 33 (FIG. 5). That is, the second through hole 39 and the fourth through hole 41 are through holes having the same opening shape. The positioning protrusion 33 (FIG. 5) is fitted into the second through hole 39 and the fourth through hole 41. The positioning protrusion 33 (FIG. 5) positions the pushing piece 25 and the central convex portion 34 at predetermined positions. That is, the pushing piece 25 can be disposed at a position adjacent to the central convex portion 34 by fitting the positioning protrusion 33 to the second through hole 39 and the fourth through hole 41. The positioning protrusion 33 can also be referred to as an engagement protrusion that engages the second resin portion 21 and the metal portion 22 with the first resin portion 20. The second through hole 39 may be a hole in which the positioning protrusion 33 does not pass through as long as the second through hole 39 is fitted to the positioning protrusion 33.

The second resin portion 21 and the metal portion 22 overlap each other in a top view. In a top view, the metal portion 22 is disposed in a manner of not protruding from the second resin portion 21 except for the portion of the pushing piece 25.

An arm side surface 44 at a tip end of each of five radially extending portions of the second resin portion 21 has an arc shape corresponding to the concave portion 31 (FIG. 4). A locking and fitting protrusion 42 is provided on the arm side surface 44. The locking and fitting protrusion 42 is a linear protrusion provided on the arm side surface 44. The locking and fitting protrusion 42 is fitted into the locking and fitting groove 37 (FIG. 4). The metal portion 22 and the second resin portion 21 can be fixed to the first resin portion 20 (FIG. 4) by fitting the locking and fitting protrusion 42 to the locking and fitting groove 37 (FIG. 4). That is, it can be said that the first resin portion 20 (FIG. 4) is provided with a first coupling portion referred to as the locking and fitting groove 37, and the second resin portion 21 is provided with a second coupling portion referred to as the locking and fitting protrusion 42. The first resin portion 20 and the second resin portion 21 are fixed to each other by coupling the first coupling portion and the second coupling portion to each other. In addition, the first resin portion 20 and the second resin portion 21 can be firmly fixed to each other by an adhesive.

A thick portion 43 is provided at a tip end portion of each of five radially extending portions from the center of the second resin portion 21. The thick portions 43 are disposed at equal distances from the rotation center of the second resin portion 21. The thick portion 43 improves strength of an outer peripheral portion of the second resin portion 21, and prevents deformation such as bending or twisting when the second resin portion 21 is fixed to the first resin portion 20 (FIG. 4). The thick portion 43 improves the strength such that the locking and fitting protrusion 42 is not deformed. A thickness of the thick portion 43 is approximately equal to the thickness of the metal portion 22, and is twice the thickness of the base portion 36. The locking and fitting protrusion 42 is disposed at a central portion of the thick portion 43 in a thickness direction.

The central convex portion 34 that protrudes from the base portion 36 of the second resin portion 21 is provided adjacent to each of the pushing piece holes 30. That is, when the second resin portion 21 and the metal portion 22 are fitted to each other, each of the pushing pieces 25 and each of the central convex portions 34 are adjacent to each other. When a coin is pushed by the pushing piece 25, a force is applied to the pushing piece 25. When a force is applied to the pushing piece 25, the pushing piece 25 is prevented from being deformed by the central convex portion 34 adjacent to the pushing piece 25. Although the central convex portion 34 is made of resin, since a coin does not come into direct contact with the central convex portion 34, the central convex portion 34 is not scrapped by the coin. When the pushing piece 25 pushes a coin in a state that the coin is brought into contact with the control pin 13 (FIG. 2) or the moving roller 16, the pushing piece 25 receives a strong force. When the pushing piece 25 is made of plastic, the pushing piece 25 may be damaged. Even when the pushing piece 25 is made of metal, the pushing piece 25 may be bent to an opposite side relative to a rotation direction. Since the central convex portion 34 is disposed adjacent to the pushing piece 25, the central convex portion 34 can prevent the pushing piece 25 from being deformed. In addition, a surface of the pushing piece 25 at a side where the pushing piece 25 comes into contact with the central convex portion 34 is the entire surface of the pushing piece 25, and the entire surface of the pushing piece 25 is brought into contact with the central convex portion 34 and is supported by the central convex portion 34. Since the entire surface of the pushing piece 25 is supported, it is possible to prevent the pushing piece 25 from being bent due to the contact with the coin 10. A width of the central convex portion 34 is substantially the same as a width of the pushing piece 25, a length of the central convex portion 34 is longer than the width of the central convex portion 34, and the strength of the central convex portion 34 in the rotation direction is enhanced. The central convex portion 34 is not deformed even when a force is applied from the pushing piece 25.

Figure 8A:
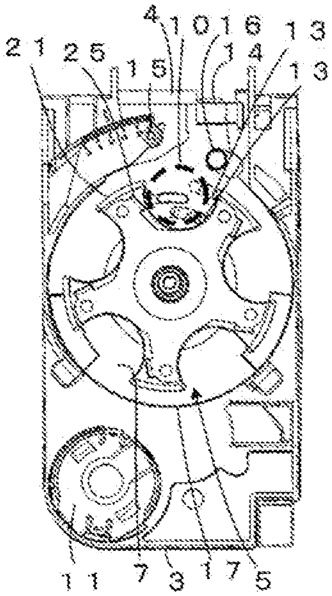
FIGS. 8A to 8F are views showing an operation of the coin hopper.
Figure 8B:
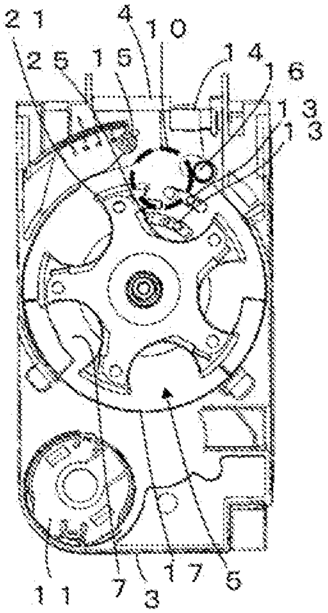
Figure 8C:
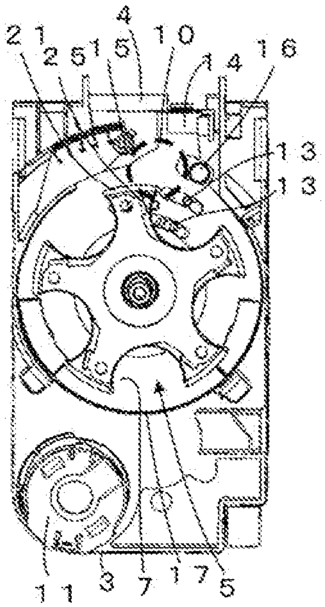
Figure 8D:
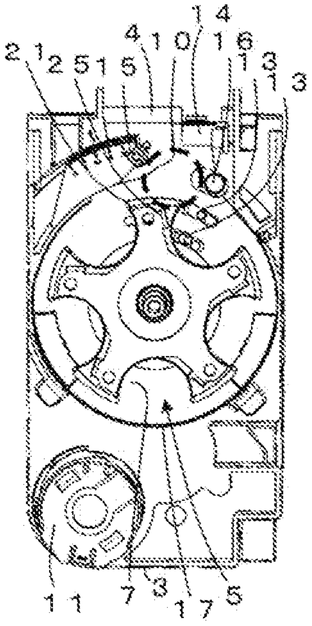
Figure 8E:
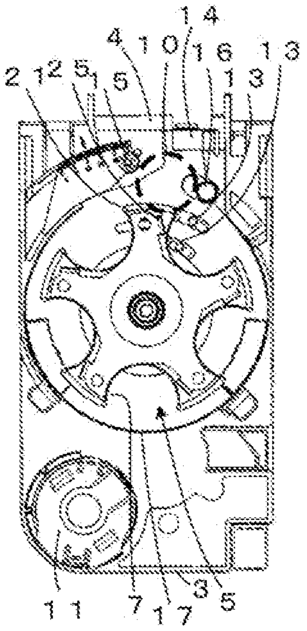
Figure 8F:
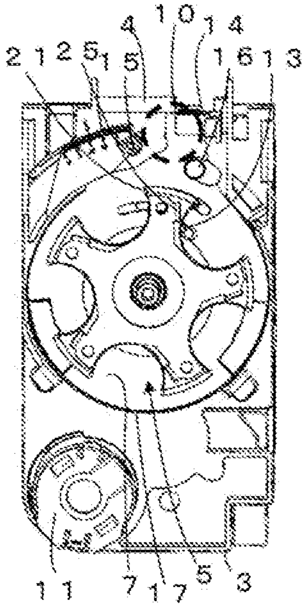

Next, an operation of discharging a coin from the coin hopper will be described with reference to FIGS. 8A to 8F. FIGS. 8A to 8F are views showing an operation of the coin hopper. FIG. 8A is a view showing a first state of the operation of the coin hopper. FIG. 8B is a view showing a second state of the operation of the coin hopper. FIG. 8C is a view showing a third state of the operation of the coin hopper. FIG. 8D is a view showing a fourth state of the operation of the coin hopper. FIG. 8E is a view showing a fifth state of the operation of the coin hopper. FIG. 8F is a view showing a sixth state of the operation of the coin hopper.

FIGS. 8A to 8F are top views showing states in which the container 2 (FIG. 1) and the first resin portion 20 (FIG. 3) are removed for the convenience of seeing a state that the coin 10 comes into contact with the rotating body 5. State changes are shown in the order from FIG. 8A to FIG. 8F. The coin 10 is indicated by a broken line.

The rotating body 5 rotates in a counterclockwise direction and moves the coin 10 that entered a concave portion of the rotating body 5. The coin 10 is pushed by the pushing piece 25 and is conveyed in a state that the coin 10 is surrounded by the outer wall 17 and the concave portion of the rotating body 5. The pushing piece 25 passes between the two control pins 13.

FIG. 8A shows a state that the coin 10 moves to a position where the coin 10 comes into contact with the control pin 13. The coin 10 comes into contact with a side wall of the second resin portion 21 and the pushing piece 25.

In accordance with the rotation of the rotating body 5, the pushing piece 25 pushes the coin 10 in the rotation direction of the rotating body 5. The control pin 13 restricts the coin 10 from moving in the rotation direction of the rotating body 5. Therefore, a moving direction of the coin 10 is changed to a direction of the payout opening 4. A force for changing the moving direction of the coin 10 is applied to the pushing piece 25.

FIG. 8B shows a state that the coin 10 moves toward the payout opening 4 and comes into contact with the moving roller 16. The coin 10 is pushed by the pushing piece 25 in accordance with the rotation of the rotating body 5. The coin 10 is separated from the control pin 13 at the center side of the rotating body 5 and comes into contact with the control pin 13 at an outer side. A contact position of the pushing piece 25 with the coin 10 is moved in a direction away from the center of the rotating body 5 as the rotating body 5 rotates.

FIG. 8C shows a state that the coin 10 moves in the direction of the payout opening 4 in accordance with the rotation of the rotating body 5 and comes into contact with the fixed roller 15 and the moving roller 16. The coin 10 pushed by the pushing piece 25 moves in the direction of the payout opening 4 and is separated from the control pin 13. When the coin 10 does not come into contact with the fixed roller 15 and the moving roller 16, a distance between the fixed roller 15 and the moving roller 16 is smaller than a diameter of the coin 10. As the rotating body 5 rotates, the moving roller 16 is pushed by the coin 10, and the distance between the fixed roller 15 and the moving roller 16 increases. Since the moving roller 16 can move in a direction away from the fixed roller 15, the coin 10 can move in the direction of the payout opening 4. A force for pushing the moving roller 16 is applied to the pushing piece 25.

FIG. 8D shows a state that the coin 10 moves between the fixed roller 15 and the moving roller 16 in the direction of the payout opening 4. When the coin 10 comes into contact with both the fixed roller 15 and the moving roller 16 and is further pushed by the pushing piece 25, the moving roller 16 moves in a direction away from the fixed roller 15. The coin 10 passes through a space between the fixed roller 15 and the moving roller 16 and further moves in the direction of the payout opening 4.

FIG. 8E shows a state that the distance between the fixed roller 15 and the moving roller 16 is equal to the diameter of the coin 10. The coin 10 is pushed by the pushing piece 25 until the coin 10 further moves in the direction toward the payout opening 4 and the distance between the fixed roller 15 and the moving roller 16 exceeds the diameter of the coin 10.

Since an end portion of the pushing piece 25 in an outer peripheral direction of the rotating body 5 is brought into contact with the coin 10, a reaction force when the coin 10 is pushed is applied to the end portion of the pushing piece 25. That is, since a strong force is applied to the pushing piece 25, the pushing piece 25 is deformed and worn in a case where the pushing piece 25 is made of resin. For example, when an edge of the coin 10 strongly hits the resin portion, the resin portion may be scrapped.

FIG. 8F shows a state that the coin 10 is separated from the pushing piece 25 and moves in the direction toward the payout opening 4. The moving roller 16 is biased by a spring in a direction in which the moving roller 16 comes close to the fixed roller 15. The coin 10 is pushed by the pushing piece 25 until the distance between the fixed roller 15 and the moving roller 16 is equal to the diameter of the coin 10. Thereafter, the coin 10 is pushed by the moving roller 16 and moves in the direction of the payout opening 4. The moving roller 16 moves in a direction in which the moving roller 16 comes close to the fixed roller 15 while pushing a side surface of the coin 10. Then, the moving roller 16 returns to an initial position.

Since the moving roller 16 is biased by the spring in a direction in which the moving roller 16 comes close to the fixed roller 15, the moving roller 16 is moved in a direction of the fixed roller 15 by the biasing force of the spring. The coin 10 is pushed in the direction of the payout opening 4 by the moving roller 16. The discharge sensor 14 detects a matter that the coin 10 passed through.

An end portion of the pushing piece 25 at a side close to the center of a contact surface with the rotating body 5 is referred to as a first end portion, and an end portion of the pushing piece 25 at a side far from the center is referred to as a second end portion. In a state that the coin 10 comes into contact with the control pin 13 at the side close to the center of the rotating body 5, the first end portion of the pushing piece 25 is brought into contact with the coin 10. In a state that the coin 10 comes into contact with the control pin 13 at the side far from the center of the rotating body 5, the second end portion of the pushing piece 25 is brought into contact with the coin 10. That is, in a top view, a surface of the pushing piece 25 that comes into contact with the coin 10 is disposed in a direction intersecting a line passing through the center of the rotating body 5. A contact position of the pushing piece 25 with the coin 10 is moved from a rotation center direction side of the rotating body 5 to a direction side away from the rotation center in accordance with the rotation of the rotating body 5. The coin 10 moves in a direction away from the rotation center in accordance with the rotation of the rotating body 5. Since the control pin 13 is disposed at a predetermined position of the base 7, when the coin 10 is conveyed to the predetermined position, a moving direction of the coin 10 is changed and the coin 10 is discharged.

The pushing piece 25 changes the moving direction of the coin 10 from the rotation direction of the rotating body 5 to a direction between the fixed roller 15 and the moving roller 16 at a position where the coin 10 comes into contact with the control pin 13. Therefore, a force is applied to the coin 10 in a direction intersecting with the rotation direction of the rotating body 5. Depending on a direction in which the force is applied, the rotation of the rotating body 5 is stopped and a jam occurs. In a worst case, a component is damaged.

A length of the surface of the pushing piece 25 that comes into contact with the coin 10 is smaller than a distance between the two control pins 13. That is, the pushing piece 25 passes between the two control pins 13 in accordance with the rotation of the rotating body 5. Since an end portion of a surface of the pushing piece 25 that comes into contact with the coin 10 comes into contact with the coin 10, a strong force is applied to the end portion. Therefore, the end portion of the pushing piece 25 is preferably made of metal, and in particular, is preferably made of hard metal such as an iron alloy such as stainless steel, a titanium alloy, or an aluminum alloy.

Figure 9:
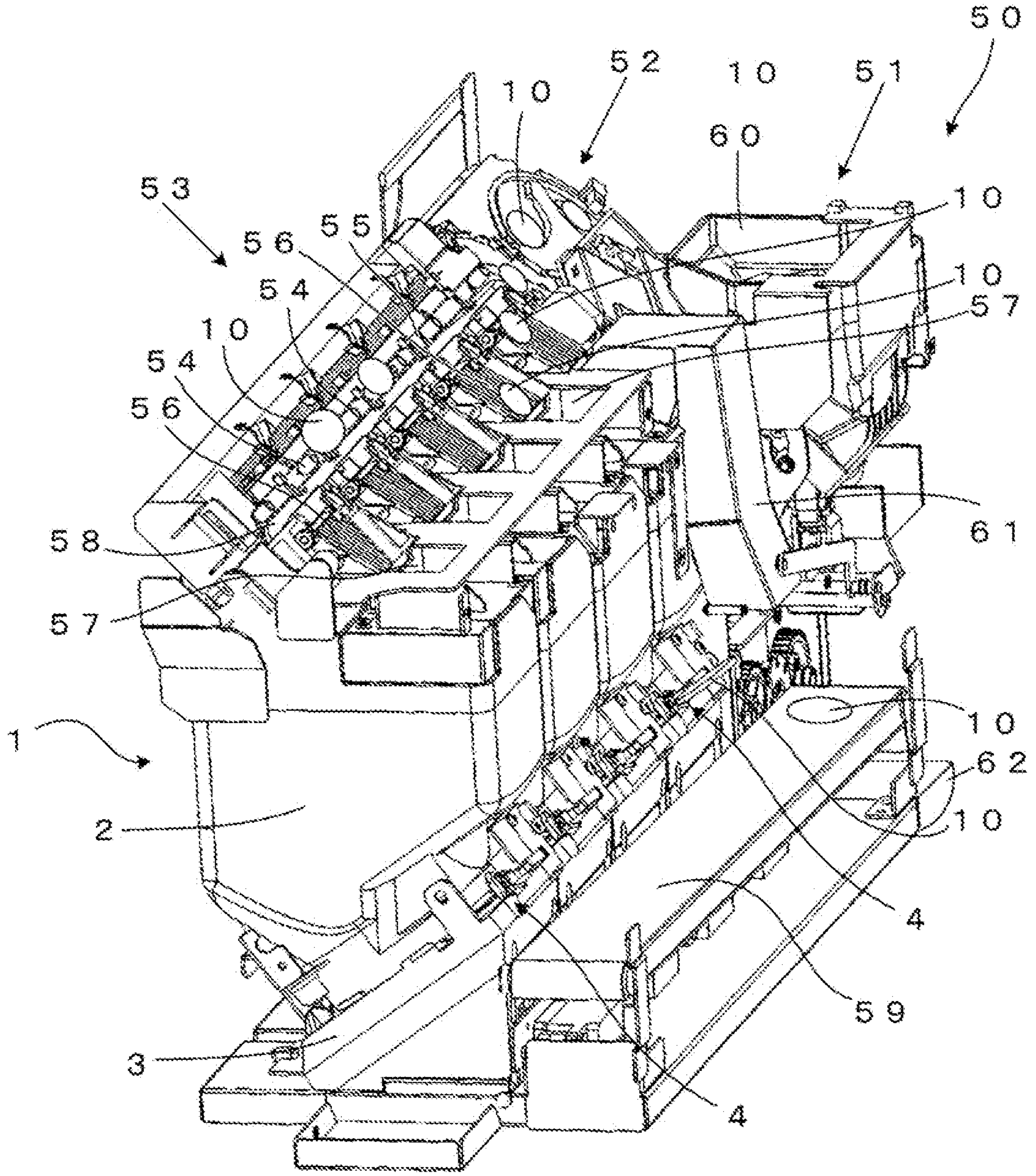
FIG. 9 is a perspective view showing an example of a coin processing device.

Next, a coin processing device will be described. FIG. 9 is a perspective view showing an example of the coin processing device.

The coins 10 stored in a storage container 60 of a coin processing device 50 are mixed coins of a plurality of denominations. The coin processing device 50 classifies the coins 10 stored in the storage container 60 for each denomination and stores the classified coins 10 in the coin hopper 1. The coin processing device 50 is a device that discharges the coins 10 from the coin hopper 1 based on an instruction from an external device. Such a coin processing device 50 is installed in a POS system, a money exchange machine, or the like.

The coin processing device 50 includes a separation unit 51, an identification unit 52, and a sorting unit 53. The coins 10 of different denominations are inserted into the storage container 60 in a mixed state. The separation unit 51 hands over the coins 10 one by one to the identification unit 52. The identification unit 52 causes a sensor (not shown) to detect characteristics of the coins 10 conveyed one by one, and identifies the denomination of the coins. The coin 10 whose denomination is specified is handed over from the identification unit 52 to the sorting unit 53. The sorting unit 53 stores the coin 10 whose denomination is specified into the corresponding coin hopper 1.

In the sorting unit 53, the coin 10 is conveyed along a rail 58 by a conveyance pin 54. A sorting flap 55 is disposed along the rail 58. The sorting flap 55 changes a moving path of the coin 10 by a drive unit (not shown). The coin 10 drops to a slider 56 or passes by the slider 56 without being dropped to the slider 56 according to a state of the sorting flap 55. When the coin 10 drops to the slider 56, the coin 10 passes through a guide path 57 and is stored in the container 2 of the coin hopper 1.

The coin 10 whose denomination is identified is stored in one of the four coin hoppers 1, or is guided to a reject passage 61 and discharged to a payout tray 62. Since four coin hoppers 1 are provided, the coins 10 of four denominations can be stored, and coins of the other denominations are discharged without being accepted. The coins 10 are discharged onto a discharge belt 59 from a plurality of coin hoppers 1 arranged in a row. That is, it can be said that the discharge belt 59 is a coin receiving portion that receives the coins 10 discharged from the plurality of coin hoppers 1 arranged in a row. The coins 10 can be collected at one position by rotating the discharge belt 59.

The coins 10 discharged from the payout opening 4 of the coin hopper 1 are placed on the discharge belt 59. The discharge belt 59 is driven by a drive unit (not shown) to convey the coins 10 to the payout tray 62.

Figure 10:
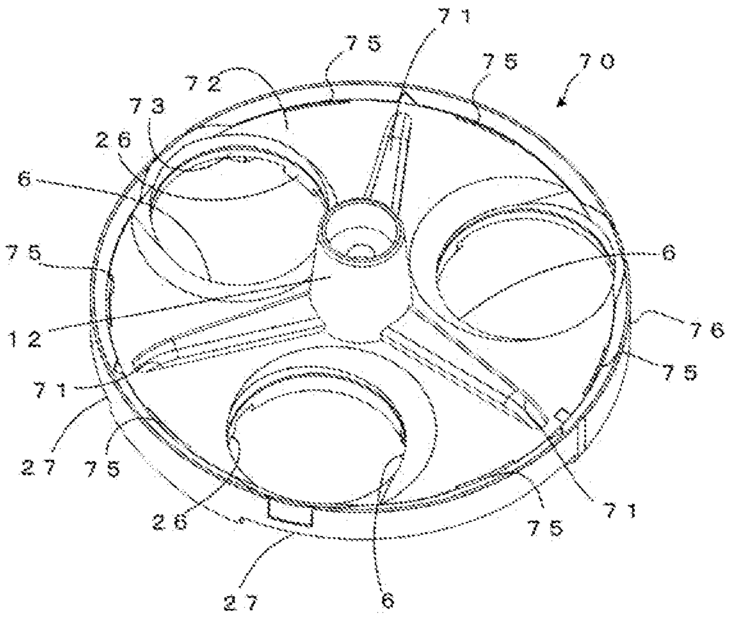
FIG. 10 is a perspective view showing an example of a second rotating body.

Next, a second example of a rotating body will be described with reference to FIGS. 10 to 14. A second rotating body 70 can be applied to the rotating body of the coin hopper described above. FIG. 10 is a perspective view showing an example of the second rotating body.

In the second rotating body 70, a second metal portion that is a metal rotating body to be described later is sandwiched between two resin rotating bodies of a third resin portion 72 and a fourth resin portion 73. A material of the rotating body made of resin is preferably plastic having good workability and high durability, such as engineering plastic. A material of the metal rotating body is preferably metal having good workability and high durability, such as an iron alloy, a titanium alloy, and an aluminum alloy.

The third resin portion 72 is provided with stirring protrusions 71 disposed between the separation holes 6, and the stirring protrusions 71 stir coins in the container. The second rotating body 70 is provided with a stirring portion 12 at a position of a rotation center. The stirring protrusions 71 are protrusions radially extending from the stirring portion 12 disposed on a surface of the third resin portion. When the second rotating body 70 rotates, the stirring portion 12 and the stirring protrusions 71 stir the coins in the container.

The fourth resin portion 73 includes a wall portion 76 erected along an outer periphery of the fourth resin portion 73. The wall portion 76 is provided with a plurality of locking protrusions 75. Each of the locking protrusions 75 is retained at a predetermined position on an outer peripheral side of the third resin portion 72, and the third resin portion 72 and the fourth resin portion 73 are fixed to each other. The fourth resin portion 73 is provided with a discharge groove 27 through which coins to be discharged to respective separation holes 6 pass.

Each of the separation holes 6 is provided with the reverse rotation piece 26 at a downstream side in a rotation direction of the second rotating body 70, and the reverse rotation piece 26 comes into contact with a coin when the second rotating body 70 rotates in a reverse direction. The discharge groove 27 allows a coin to move from an inner peripheral side to an outer peripheral side of the wall portion 76.

Figure 11:
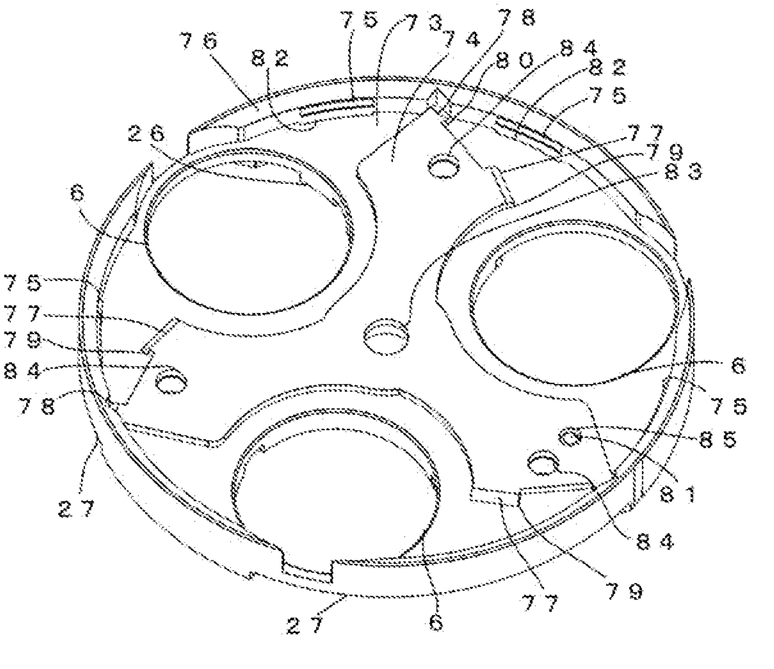
FIG. 11 is a first view showing a structure of an example of the second rotating body.
Figure 12:
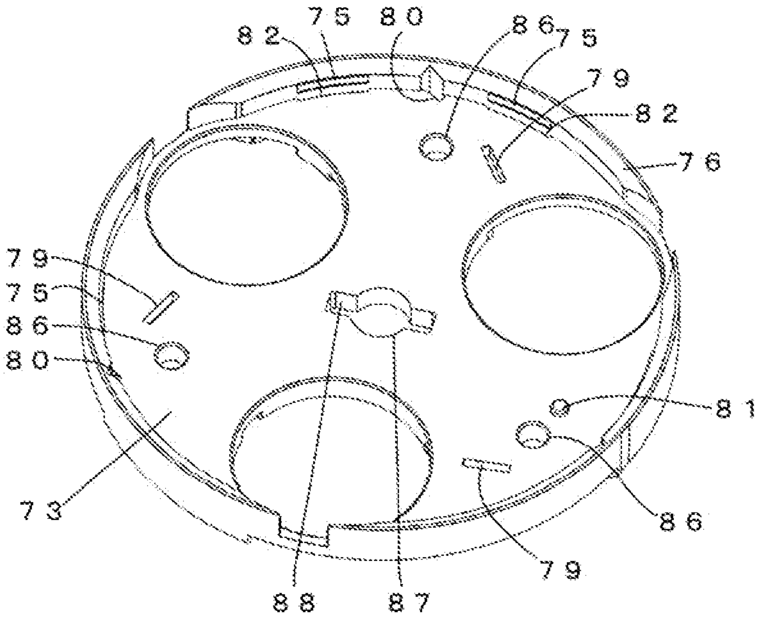
FIG. 12 is a second view showing a structure of an example of the second rotating body.

Next, a structure of the second rotating body 70 will be described. FIG. 11 is a first view showing a structure of an example of the second rotating body. FIG. 11 shows a state that a second metal portion 74 is fitted to the fourth resin portion 73 of the second rotating body 70. FIG. 12 is a second view showing a structure of an example of the second rotating body. FIG. 12 is a perspective view showing the fourth resin portion 73 which is a part of the second rotating body 70.

A rotation shaft is inserted through a third shaft hole 83 at a rotation center of the second metal portion 74. The second metal portion 74 is provided with metal plate arms disposed between adjacent separation holes 6, the metal plate arms extend radially in three directions and at equal intervals around the third shaft hole 83. A bent portion bent substantially at a right angle is provided at a tip end side of each of the metal plate arms extending in the three directions. The bent portions serve as a second pushing piece 77 and a third pushing piece 78 for pushing coins. The second pushing pieces 77 are inserted into second pushing piece holes 79 respectively that pass through the front and back of the fourth resin portion 73, and a tip end of each of the second pushing pieces 77 protrudes from a back surface side of the fourth resin portion 73. The third pushing piece 78 are inserted into third pushing piece holes 80 respectively that pass through the front and back of the fourth resin portion 73, and a tip end of each of the third pushing pieces 78 protrudes from the back surface side of the fourth resin portion 73.

Outer peripheral through holes 82 are provided along a base of the wall portion 76 of the fourth resin portion 73. The outer peripheral through holes 82 are through holes that pass through the front and back of the fourth resin portion 73. The outer peripheral through holes 82 are provided at positions corresponding to the locking protrusions 75. When the third resin portion 72 is hooked on the locking protrusions 75, the wall portion 76 is easily bent to prevent damage.

Two locking protrusions 75 are disposed between adjacent separation holes 6. The third pushing piece 78 is disposed between the adjacent locking protrusions 75. A rotation center of the second metal portion 74 of the second rotating body 70 is fixed to a rotation shaft.

The second metal portion 74 is provided with fifth through holes 84 disposed at an upstream side of the corresponding second pushing pieces 77 in a rotation direction. The fifth through hole 84 is disposed in each of arms of the second metal portion 74. The fifth through holes 84 are through holes that pass through the front and back of the second metal portion 74. A protrusion to be described later is fitted into each of the fifth through holes 84, and looseness of the second metal portion 74 in the rotation direction is prevented by the protrusion. The fourth resin portion 73 is provided with a second positioning protrusion 81, and the second positioning protrusion 81 is fitted into a sixth through hole 85 of the second metal portion 74. The second positioning protrusion 81 indicates a fixed position of the second metal portion 74 relative to the fourth resin portion 73.

The fourth resin portion 73 is provided with seventh through holes 102 at positions corresponding to the fifth through holes 84 respectively. Openings 86 are openings of the seventh through holes 102 in a contact surface of the fourth resin portion 73 with the second metal portion 74. The seventh through holes 102 are through holes that pass through the front and back of the fourth resin portion 73. Protrusions to be described later are fitted into the fifth through holes 84 and the seventh through holes 102, and looseness of the second metal portion 74 and the fourth resin portion 73 in the rotation direction is prevented by the protrusion. The seventh through holes 102 may be holes in which the protrusions do not pass through as long as the protrusions are fitted to the seventh through holes 102.

The fourth resin portion 73 includes a second shaft hole 87. The second shaft hole 87 is provided with a rotation stop hole 88. A rotation shaft is inserted into the second shaft hole 87, and a rotation stop lever fixed perpendicularly to the rotation shaft is fitted into the rotation stop hole 88. The rotation shaft and the fourth resin portion 73 are fixed such that the rotation of the fourth resin portion 73 is interlocked with the rotation of the rotation shaft. The rotation of the rotation shaft may be transmitted to the fourth resin portion 73 in a similar manner by making a cross section of the rotation shaft into a non-circular shape and making the rotation stop hole 88 into a shape corresponding to the non-circular shape.

Figure 13:
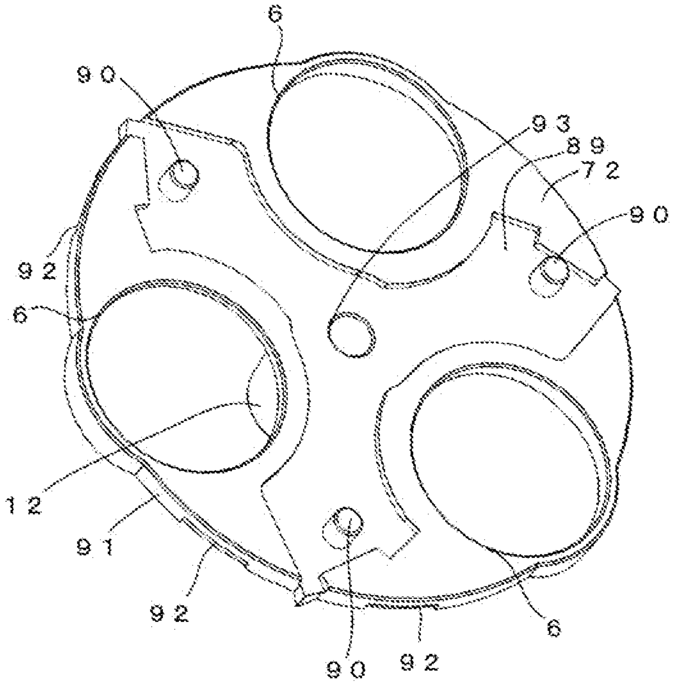
FIG. 13 is a third view showing a structure of an example of the second rotating body.

Next, the third resin portion 72 will be described. FIG. 13 is a third view showing a structure of an example of the second rotating body.

The stirring portion 12 is provided at a front side of the third resin portion 72. A second concave portion 89 that houses the second metal portion 74 is provided on a back side of the third resin portion 72. The second concave portion 89 is formed along an outer shape of the second metal portion 74.

A fourth shaft hole 93 is provided at a rotation center of the third resin portion 72. A rotation shaft is inserted into the fourth shaft hole 93.

The second concave portion 89 is provided with three third positioning protrusions 90. The third positioning protrusions 90 are disposed at positions corresponding to the fifth through holes 84 of the second metal portion 74 and the seventh through holes 102 of the fourth resin portion 73, and are fitted into the respective holes. The third positioning protrusions 90 are fitted into the fifth through holes 84 and the seventh through holes 102, and looseness among the third resin portion 72, the fourth resin portion 73, and the second metal portion 74 in the rotation direction is prevented by the third positioning protrusions 90. The second rotating body 70 rotates as an integrated body of the third resin portion 72, the fourth resin portion 73, and the second metal portion 74. A cross section of each of the third positioning protrusions 90 is circular, and is not limited to a circular shape. A shape of the cross section of each of the third positioning protrusions 90 may be a polygonal shape, an elliptical shape, or the like, and is preferably a shape that can be easily processed.

A peripheral surface 91 that is a side surface of the third resin portion 72 is provided with locking concave portions 92. The locking concave portions 92 are disposed at positions corresponding to the locking protrusions 75 respectively. Each of the locking protrusion 75 and each of the locking concave portions 92 are engaged with each other, and the third resin portion 72 and the fourth resin portion 73 are fixed to each other. The second metal portion 74 is sandwiched and fixed between the third resin portion 72 and the fourth resin portion 73. The second rotating body 70 can be easily assembled and disassembled. It can be said that the locking concave portions 92 are contact portions that come into contact with the locking protrusions 75, and the locking protrusions 75 are contact portions that come into contact with the locking concave portions 92.

Figure 14:
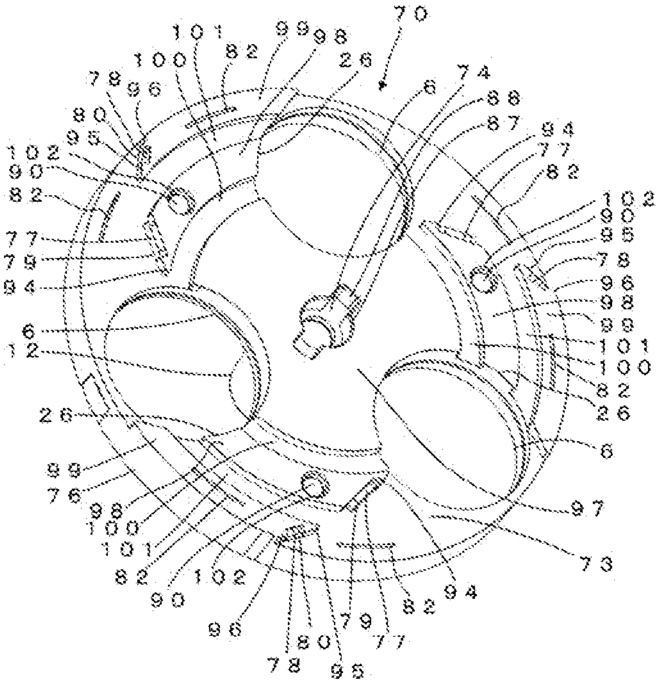
FIG. 14 is a perspective view showing a back surface side of an example of the second rotating body.

Next, a back surface side of the second rotating body 70 will be described. FIG. 14 is a perspective view showing a back surface side of an example of the second rotating body. In the second rotating body 70, the second metal portion 74 is sandwiched between the third resin portion 72 and the fourth resin portion 73, and the third resin portion 72 and the fourth resin portion 73 are fitted and fixed to each other.

The fourth resin portion 73 is disposed at the back surface side of the second rotating body 70. A back surface of the fourth resin portion 73 is provided with a groove in order to avoid the control pin when the second rotating body 70 rotates. A first escape groove 100 and a second escape groove 101 of the fourth resin portion 73 are grooves through which the control pin passes without coming into contact with the fourth resin portion 73. In order to form such grooves, the fourth resin portion 73 is provided with second central convex portions 97, second inner peripheral convex portions 98, and second outer peripheral convex portions 99.

The second inner peripheral convex portions 98 are provided between the first escape groove 100 and the second escape groove 101. The second inner peripheral convex portion 98 is provided at an upstream side of each of the second pushing piece 77 in the rotation direction of the second rotating body 70. Each of the second inner peripheral convex portion 98 is adjacent to the second pushing piece 77 and prevents deformation of the corresponding second pushing piece 77 against a force applied when the corresponding second pushing piece 77 comes into contact with a coin.

The seventh through hole 102 is provided in each of the second inner peripheral convex portions 98. The seventh through hole 102 is provided at an upstream side of each of the second pushing pieces 77 in the rotation direction of the second rotating body 70, and the third positioning protrusion 90 is fitted into each of the seventh through holes 102. When a coin is pushed by the second pushing piece 77, most force is applied to the upstream side of the second pushing piece 77 in the rotation direction of the second rotating body 70. Therefore, the third positioning protrusion 90 is provided at the upstream side of each of the second pushing pieces 77 in the rotation direction of the second rotating body 70. The third positioning protrusions 90 firmly couple the third resin portion 72, the fourth resin portion 73, and the second metal portion 74 so that the third resin portion 72, the fourth resin portion 73, and the second metal portion 74 do not shift from one another.

The second pushing piece hole 79 is provided adjacent to each of the second inner peripheral convex portions 98 at a downstream side of each of the second inner peripheral convex portions 98 in the rotation direction of the second rotating body 70. A first buffer portion 94 is provided at a side of the second pushing piece hole 79 of each of the second inner peripheral convex portion 98 in a direction of the rotation center of the second rotating body 70. The third pushing piece hole 80 is provided adjacent to each of the second outer peripheral convex portions 99 at a downstream side of each of the second outer peripheral convex portion s 99 in the rotation direction of the second rotating body 70. A second buffer portion 95 and a third buffer portion 96 are provided at a rotation center side and an outer peripheral side of the second rotating body 70 respectively with respect to the third pushing piece hole 80 in each of the second outer peripheral convex portions 99.

Each of the first buffer portions 94 prevents a coin from coming into contact with an edge of the corresponding second pushing piece 77. A coin may be scratched when the coin comes into contact with the edge of the second pushing piece 77. When the second rotating body 70 rotates, the first buffer portion 94 covers the edge at a side where the coin first comes into contact with the second pushing piece 77. This is because this portion easily scratches the coin. In this example, an edge at one side of the second pushing piece 77 is covered with the first buffer portion 94, however, edges at both sides of the second pushing piece 77 may be covered with the first buffer portion 94. The second buffer portion 95 and the third buffer portion 96 cover edges at both sides of the third pushing piece 78 and prevent the edges and the coins from coming into contact with each other. Since the first buffer portions 94, the second buffer portions 95, and the third buffer portions 96 do not push coins with a strong force, the first buffer portions 94, the second buffer portions 95, and the third buffer portions 96 can be formed of resin.

The second shaft hole 87 is opened wider than the third shaft hole 83. Therefore, a periphery of the third shaft hole 83 of the second metal portion 74 is exposed from the second shaft hole 87. The second metal portion 74 comes into contact with and is fixed to the rotation shaft. When a predetermined position of the rotation shaft comes into contact with the periphery of the third shaft hole 83 and the rotation shaft is fixed, a distance between the second metal portion 74 and the base can be made constant. Predetermined positions are brought into contact with each other and fixed. Although a configuration in which a protrusion is provided in the third resin portion 72 and a through hole is provided in the fourth resin portion 73 is described as an example, a through hole may be provided in the third resin portion 72 and a protrusion may be provided in the fourth resin portion 73.

Figure 15:
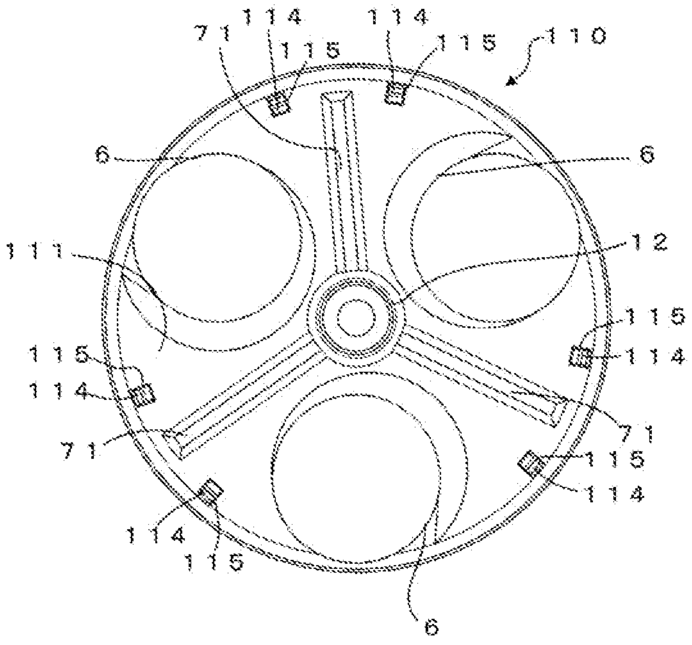
FIG. 15 is a top view showing an example of a third rotating body.
Figure 16:
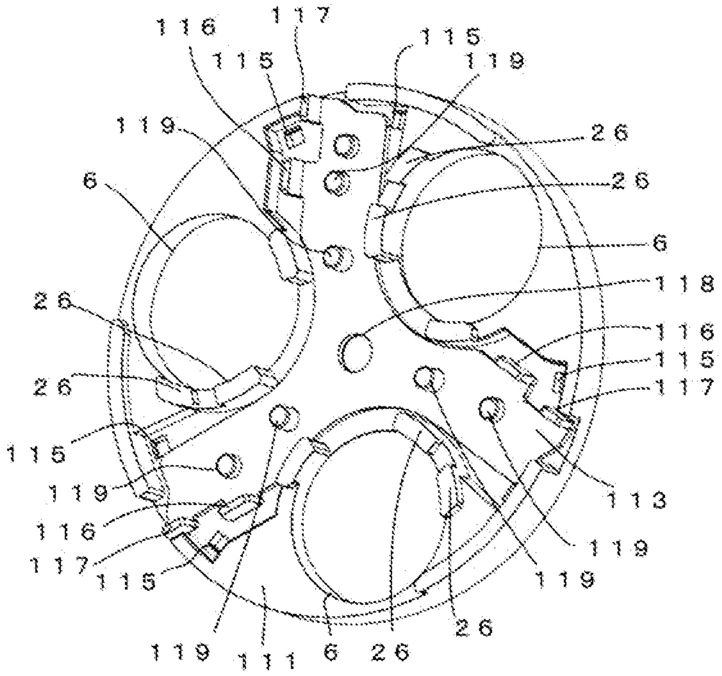
FIG. 16 is a first view showing a structure of an example of the third rotating body.
Figure 17:
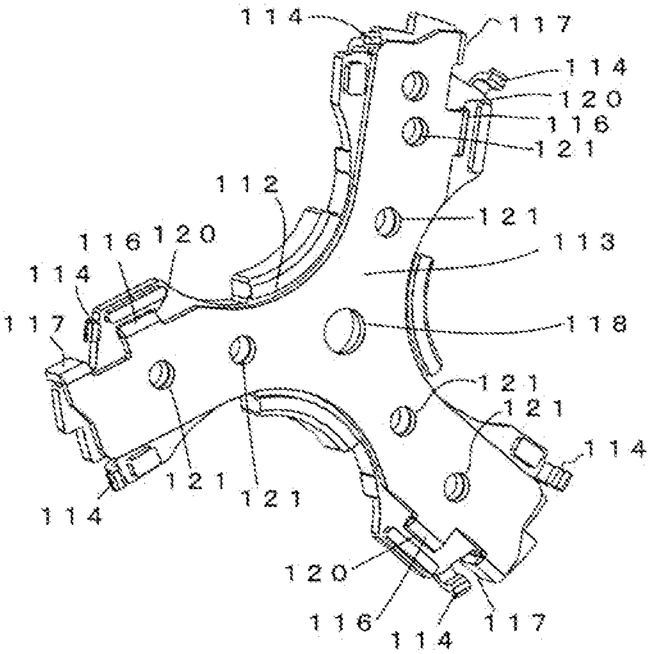
FIG. 17 is a second view showing a structure of an example of the third rotating body.
Figure 18:
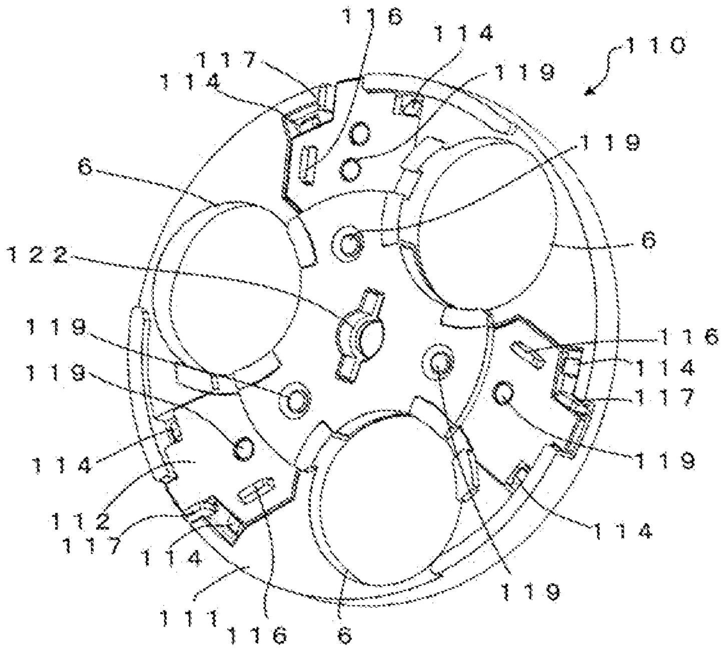
FIG. 18 is a perspective view showing a back surface side of an example of the third rotating body.

Next, a third example of a rotating body will be described with reference to FIGS. 15 to 18. A third rotating body 110 can be applied to the rotating body of the coin hopper described above. First, an outer shape of the third rotating body 110 will be described with reference to FIGS. 15 and 18. FIG. 15 is a top view showing an example of the third rotating body. FIG. 15 is a view showing the third rotating body 110 as viewed from directly above. FIG. 18 is a perspective view showing a back surface side of an example of the third rotating body.

The third rotating body 110 is provided with three separation holes 6. The stirring protrusions 71 extend radially from the stirring portion 12 on an upper surface of third rotating body 110.

The third rotating body 110 includes a fifth resin portion 111 at an upper surface side, a sixth resin portion 112 at a back surface side, and a third metal portion 113 which will be described later and is sandwiched between the fifth resin portion 111 and the sixth resin portion 112. The fifth resin portion 111 is provided with second locking concave portions 115, and the second locking concave portions 115 are respectively engaged with second locking protrusions 114 provided on the sixth resin portion 112 to fix the fifth resin portion 111 and the sixth resin portion 112. The third rotating body 110 can be easily assembled and disassembled.

The second locking concave portions 115 are disposed at an outer peripheral side of the fifth resin portion 111, and are provided between the adjacent separation holes 6. The second locking concave portions 115 sandwich the stirring protrusion 71.

Fourth pushing pieces 116 and fifth pushing pieces 117 protrude from predetermined positions of the back surface side of the sixth resin portion 112 and push coins.

The fifth resin portion 111 is provided with fourth positioning protrusions 119, and the fourth positioning protrusions 119 are fitted into through holes provided in the third metal portion 113 and through holes provided in the sixth resin portion 112 which will be described later. At least one fourth positioning protrusion 119 is disposed at an upstream side of each of the fourth pushing pieces 116 in a rotation direction of the third rotating body 110 and disposed between each of the fourth pushing pieces 116 and each of the separation holes 6. The fourth positioning protrusions 119 are fitted into through holes, and the fourth positioning protrusions 119 prevent looseness among the fifth resin portion 111, the sixth resin portion 112, and the third metal portion 113 to be described later in the rotation direction. An upstream side of a base of each of the fourth pushing pieces 116 in the rotation direction of the third rotating body 110 is supported by the sixth resin portion 112. Although a force is applied to the fourth pushing piece 116 when the fourth pushing piece 116 pushes a coin, the fourth pushing piece 116 is prevented from being bent.

A rotation shaft is inserted into a sixth shaft hole 122 of the sixth resin portion 112, and the sixth resin portion 112 is fixed to the rotation shaft.

The fourth positioning protrusion 119 is disposed at a position corresponding to each of the fourth pushing pieces 116, and another fourth positioning protrusion 119 is provided between the rotation center and the fourth positioning protrusion 119. The fourth positioning protrusions 119 prevent looseness among the fifth resin portion 111, the sixth resin portion 112, and the third metal portion 113 to be described later. The third rotating body 110 rotates as an integrated body of the fifth resin portion 111, the sixth resin portion 112, and the third metal portion 113.

Next, an inner side of the third rotating body 110 will be described. FIG. 16 is a first view showing a structure of an example of the third rotating body. FIG. 16 is a perspective view showing a state that the fifth resin portion 111 and the third metal portion 113 are fixed to each other.

A back surface side of the fifth resin portion 111 is provided with a concave portion that houses the third metal portion 113, and the third metal portion 113 is housed in the concave portion. The concave portion is provided with the fourth positioning protrusion 119. In addition, the concave portion is provided with the second locking concave portion 115.

The third metal portion 113 is provided with a fifth shaft hole 118 at the rotation center. The rotation shaft is inserted into the fifth shaft hole 118 and is fixed. The third metal portion 113 is provided with arms extending radially in three directions and at equal angles from the fifth shaft hole 118. The third metal portion 113 is provided with through holes into which the fourth positioning protrusions 119 are fitted. The fourth pushing piece 116 and the fifth pushing piece 117 are provided at each tip end side of the third metal portion 113.

Next, an inner side of the third rotating body 110 will be described from another direction. FIG. 17 is a second view showing a structure of an example of the third rotating body. FIG. 17 is a perspective view showing a state that the sixth resin portion 112 and the third metal portion 113 are fixed to each other.

The sixth resin portion 112 is provided with a fourth pushing piece hole 120 through which each of the fourth pushing pieces 116 of the third metal portion 113 is inserted. The fourth pushing pieces 116 are inserted into the fourth pushing piece holes 120 respectively and protrude to a back surface side of the sixth resin portion 112. The fifth pushing pieces 117 are disposed along an outer peripheral edge of the sixth resin portion 112 and protrude to the back surface side of the sixth resin portion 112.

The sixth resin portion 112 is provided with the second locking protrusions 114. The second locking protrusions 114 are snap-fits, and the second locking protrusions 114 engage with the second locking concave portions 115 respectively to fix the fifth resin portion 111 and the sixth resin portion 112. Each of the second locking protrusions 114 and each of the second locking concave portions 115 are provided with contact portions that come into contact with each other. In the third metal portion 113, eighth through holes 121 are disposed at positions corresponding to the fourth positioning protrusions 119 respectively.

Figure 19:
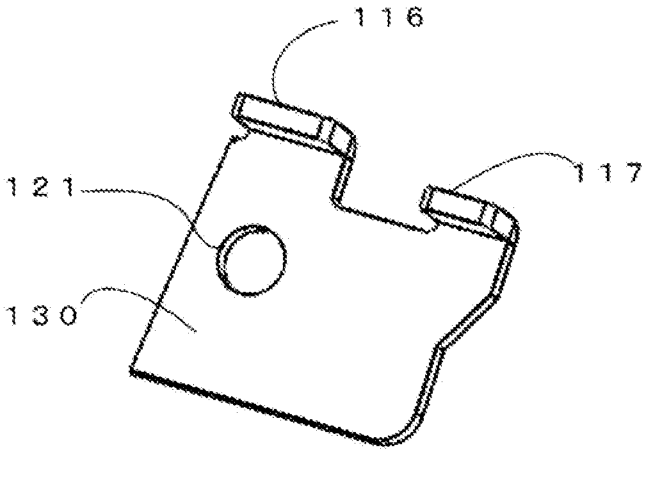
FIG. 19 is a first view showing a structure of an example of a fourth rotating body.
Figure 20:
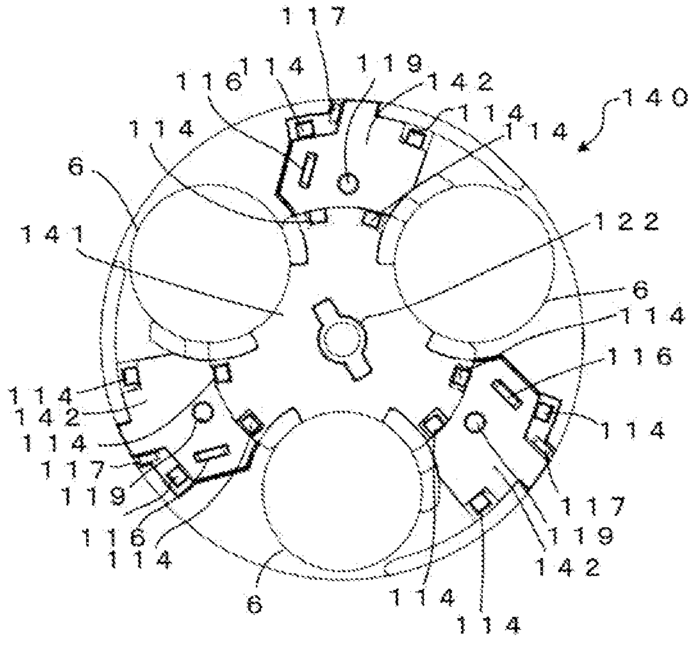
FIG. 20 is a second view showing a structure of an example of the fourth rotating body.

Next, a fourth example of a rotating body will be described with reference to FIGS. 19 and 20. A fourth rotating body 140 can be applied to the rotating body of the coin hopper described above. The fourth rotating body 140 is an example in which a pushing piece is not integrated but divided and provided for each separation hole. FIG. 19 is a first view showing a structure of an example of the fourth rotating body. FIG. 19 shows an example of a divided pushing piece. FIG. 20 is a second view showing a structure of an example of the fourth rotating body. FIG. 20 shows an example of a rotating body that fixes the divided pushing piece.

A fourth metal portion 130 is obtained by cutting out a portion including the fourth pushing piece 116, the fifth pushing piece 117, and the eighth through hole 121 of the third metal portion 113 described with reference to FIGS. 16 and 17. The fourth metal portion 130 is formed by bending a sheet metal to form the fourth pushing piece 116 and the fifth pushing piece 117, and forming a hole in the sheet metal to form the eighth through hole 121. A size can be reduced and a material can be saved by providing a plurality of pushing pieces. Since a plurality of components are to be assembled, a manufacturing process becomes complicated.

In the fourth rotating body 140, the fourth metal portion 130 is sandwiched between a seventh resin portion 141 and an eighth resin portion 142. The fourth pushing pieces 116 and the fifth pushing pieces 117 protrude from a back surface side of the fourth rotating body 140.

A hole similar to the sixth shaft hole 122 described with reference to FIGS. 16 and 17 is provided at a rotation center of the fourth rotating body 140. The fourth rotating body 140 is fixed to a rotation shaft by inserting the rotation shaft into the sixth shaft hole 122.

In the seventh resin portion 141, protrusions similar to the fourth positioning protrusions 119 described with reference to FIGS. 16 and 17 is provided in a concave portion of the seventh resin portion 141 that houses the fourth metal portion 130. When the fourth metal portion 130 is housed in the concave portion, the eighth through holes 121 are fitted to the fourth positioning protrusions 119. The fourth metal portion 130 is prevented from looseness in the rotation direction of the fourth rotating body 140 by the fourth positioning protrusions 119.

The eighth resin portion 142 is provided with four locking protrusions and locking concave portions similar to the second locking protrusions 114 and the second locking concave portions 115 described with reference to FIGS. 16 and 17. The seventh resin portion 141 is provided with locking concave portions at positions corresponding to the second locking protrusions 114. When the second locking protrusion 114 is engaged with each of the locking concave portions, the seventh resin portion 141 and the eighth resin portion 142 sandwiches the fourth metal portion 130, and the seventh resin portion 141 and the eighth resin portion 142 are fixed to one another.

INDUSTRIAL APPLICABILITY

The present invention can be applied to a coin hopper that discharges coins one by one and a coin processing device equipped with the coin hopper.

REFERENCE SIGNS LIST

1 coin hopper
2 container
3 main body
4 payout opening
5 rotating body
6 separation hole
7 base
8 guide portion
9 identification hole
10 coin
11 motor
12 stirring portion
13 control pin
14 discharge sensor
15 fixed roller

16 moving roller
17 outer wall
18 stirring blade
20 first resin portion
21 second resin portion
22 metal portion
23 shaft hole
24 shaft locking groove
25 pushing piece
26 reverse rotation piece
27 discharge groove
28 first step portion
29 second step portion
30 pushing piece hole
31 concave portion
32 outer peripheral convex portion
33 positioning protrusion
34 central convex portion
35 inner peripheral convex portion
36 base portion
37 locking and fitting groove
38 first through hole
39 second through hole
40 third through hole
41 fourth through hole
42 locking and fitting protrusion
43 thick portion
44 arm side surface
50 coin processing device
51 separation unit
52 identification unit
53 sorting unit
54 conveyance pin
55 sorting flap
56 slider
57 guide path
58 rail
59 discharge belt
60 storage container
61 reject passage
62 payout tray
75 locking protrusion
76 wall portion
77 second pushing piece
78 third pushing piece
91 peripheral surface
92 locking concave portion
94 first buffer portion
95 second buffer portion
96 third buffer portion

The invention claimed is:

1. A coin hopper comprising:

a container configured to store a coin;

a base configured to support the coin;

a rotating body that is provided with a plurality of separation holes each of which is configured to hold the coin one by one, that is fixed to a rotation shaft, and that is disposed so as to face the base; and a control pin that is disposed in a conveyance path for the coin held by the rotating body, that is configured to come into contact with the coin being conveyed, and that is configured to change a moving direction of the coin, wherein the coin stored in the container is conveyed to the base in a state that the coin is held in the separation holes, the coin is brought into contact with the control pin, and the coin is moved in a discharge direction, wherein the rotating body includes a first resin rotating body made of resin, a metal rotating body in which a metal pushing piece for pushing the coin is provided for each of the separation holes, and a second resin rotating body made of resin, wherein the metal rotating body has a first through hole, wherein the first resin rotating body or the second resin rotating body has a positioning protrusion at a position corresponding to the first through hole, wherein the first resin rotating body has a first contact portion, and the second resin rotating body has a second contact portion, wherein the metal rotating body is sandwiched between the first resin rotating body and the second resin rotating body in a state that the pushing piece is exposed from the first resin rotating body, wherein the positioning protrusion is fitted into the first through hole and restricts movement of the first resin rotating body or the second resin rotating body relative to the metal rotating body in a rotation direction, wherein the first resin rotating body, the metal rotating body, and the second resin rotating body are fixed to one another by engaging the first contact portion and the second contact portion;

wherein the first resin rotating body and the second resin rotating body are fixed to each other by coupling a coupling portion provided on the first resin rotating body to another coupling portion provided on the second resin rotating body;

wherein the pushing pieces pass through pushing piece holes respectively, and the pushing pieces are disposed so as to protrude from the first resin rotating body;

the metal rotating body is sandwiched between the first resin rotating body and the second resin rotating body, with the pushing pieces projecting outward from a rear side of the rotating body; and wherein the pushing pieces push the coin on the base.

2. The coin hopper according to claim 1, wherein the first resin rotating body has one of the positioning protrusion and a second through hole at a position corresponding to the first through hole, wherein the second resin rotating body has the second through hole at a position corresponding to the first through hole in a case where the first resin rotating body has the positioning protrusion, and the second resin rotating body has the positioning protrusion at a position corresponding to the first through hole in a case where the first resin rotating body has the second through hole, and wherein the positioning protrusion is fitted into the first through hole and the second through hole, and restricts relative movement among the first resin rotating body, the metal rotating body, and the second resin rotating body in the rotation direction.

3. The coin hopper according to claim 1, wherein the first resin rotating body or the second resin rotating body has a concave portion at a position corresponding to the metal rotating body, the positioning protrusion is provided on a bottom surface of the concave portion, the metal rotating body is inserted into the concave portion, and the metal rotating body is sandwiched between the first resin rotating body and the second resin rotating body.

4. The coin hopper according to claim 1, wherein the first resin rotating body has a convex portion that is provided adjacent to the pushing piece, that is disposed at an upstream side of the pushing piece in the rotation direction, and that protrudes toward the base from the first resin rotating body.

5. The coin hopper according to claim 4, wherein the positioning protrusion is provided at a position corresponding to the convex portion.

6. The coin hopper according to claim 1, wherein the first through hole is disposed at an upstream side of the pushing piece in the rotation direction, and disposed between the pushing piece and the separation hole disposed at an upstream side of the pushing piece in the rotation direction.

7. The coin hopper according to claim 1, wherein the metal rotating body is formed of a metal plate, and the pushing piece is formed by a bent portion obtained by bending an edge of the metal plate at a substantially right angle in a base direction.

8. The coin hopper according to claim 1, wherein the control pin is disposed at a position closer to a rotation center of the rotating body than the pushing piece, and the pushing piece moves without coming into contact with the control pin in a case that the rotating body rotates, and wherein a contact position of the pushing piece with the coin in a top view is moved from a side close to the rotation center of the rotating body to a side far from the rotation center of the rotating body as the rotating body rotates after the coin is brought into contact with the control pin.

9. The coin hopper according to claim 8, further comprising:

an another control pin, wherein the pushing piece moves between the control pin and the another control pin in a case that the rotating body rotates.

10. The coin hopper according to claim 1, wherein the second resin rotating body has a wall portion at an outer peripheral side of the second resin rotating body, and the wall portion is erected in a thickness direction of the metal rotating body, wherein the first contact portion is a locking and fitting protrusion provided on a side surface at an outer peripheral side of the first resin rotating body, wherein the second contact portion is a locking and fitting groove provided in a side surface at an inner peripheral side of the wall portion, and wherein the first resin rotating body and the second resin rotating body are fixed to each other with the metal rotating body sandwiched between the first resin rotating body and the second resin rotating body by fitting the locking and fitting protrusion into the locking and fitting groove.

11. The coin hopper according to claim 1, wherein the second resin rotating body has a wall portion at an outer peripheral side of the second resin rotating body, and the wall portion is erected in a thickness direction of the metal rotating body, wherein the first contact portion is a locking and fitting groove provided in an edge at an outer peripheral side of the first resin rotating body, wherein the second contact portion is a locking and fitting protrusion provided on a side surface at an inner peripheral side of the wall portion, and wherein the first resin rotating body and the second resin rotating body are fixed to each other with the metal rotating body sandwiched between the first resin rotating body and the second resin rotating body by fitting the locking and fitting protrusion into the locking and fitting groove.

12. The coin hopper according to claim 1, wherein a mechanism for fixing the first resin rotating body, the metal rotating body, and the second resin rotating body by engaging the first contact portion and the second contact portion is a snap-fit.

13. The coin hopper according to claim 1, wherein the metal rotating body includes a plurality of metal plates each of which is provided with the first through hole and the pushing piece, the first through hole and the pushing piece being disposed between the separation holes.

14. A coin processing device comprising:

the coin hopper according to claim 1; and a coin receiving portion configured to receive and collect the coin discharged from the coin hopper, wherein a plurality of the coin hoppers are provided, and the coin receiving portion is configured to receive the coin discharged from each of the coin hoppers.

15. A rotating body of a coin hopper, the coin hopper including: a container configured to store a coin; a base configured to support the coin; the rotating body that is provided with a plurality of separation holes each of which is configured to hold the coin one by one, that is fixed to a rotation shaft, and that is disposed so as to face the base; and a control pin that is disposed in a conveyance path for the coin held by the rotating body, that is configured to come into contact with the coin being conveyed, and that is configured to change a moving direction of the coin, wherein the coin stored in the container is conveyed to the base in a state that the coin is held in the separation holes, the coin is brought into contact with the control pin, and the coin is moved in a discharge direction, the rotating body comprising:

a first resin rotating body made of resin;

a metal rotating body in which a metal pushing piece for pushing the coin is provided for each of the separation holes; and a second resin rotating body made of resin, wherein the metal rotating body has a first through hole, wherein the first resin rotating body or the second resin rotating body has a positioning protrusion at a position corresponding to the first through hole, wherein the first resin rotating body has a first contact portion, and the second resin rotating body has a second contact portion, wherein the metal rotating body is sandwiched between the first resin rotating body and the second resin rotating body in a state that the pushing piece is exposed from the first resin rotating body, wherein the positioning protrusion is fitted into the first through hole and restricts movement of the first resin rotating body or the second resin rotating body relative to the metal rotating body in a rotation direction, wherein the first resin rotating body, the metal rotating body, and the second resin rotating body are fixed to one another by engaging the first contact portion and the second contact portion;

wherein the first resin rotating body and the second resin rotating body are fixed to each other by coupling a coupling portion provided on the first resin rotating body to another coupling portion provided on the second resin rotating body;

wherein the pushing pieces pass through pushing piece holes respectively, and the pushing pieces are disposed so as to protrude from the first resin rotating body:

the metal rotating body is sandwiched between the first resin rotating body and the second resin rotating body, with the pushing pieces projecting outward from a rear side of the rotating body; and wherein the pushing pieces push the coin on the base.

16. The rotating body of the coin hopper according to claim 15, wherein the first resin rotating body or the second resin rotating body has a concave portion at a position corresponding to the metal rotating body, the positioning protrusion is provided on a bottom surface of the concave portion, the metal rotating body is inserted into the concave portion, and the metal rotating body is sandwiched between the first resin rotating body and the second resin rotating body.

17. The coin hopper according to claim 1, wherein the positioning protrusion protrudes from a surface of the first resin rotating body or the second resin rotating body; the positioning protrusion fits to a through hole of the metal rotating body; and the through hole of the metal rotating body is provided on an arm of the metal rotating body at an upstream side with respect to the pushing piece.

18. The rotating body of the coin hopper according to claim 15, wherein the positioning protrusion protrudes from a surface of the first resin rotating body or the second resin rotating body; the positioning protrusion fits to a through hole of the metal rotating body; and the through hole of the metal rotating body is provided on an arm of the metal rotating body at an upstream side with respect to the pushing piece.

* * * * *